United States Patent
Fukui et al.

(10) Patent No.: US 9,442,222 B2
(45) Date of Patent: Sep. 13, 2016

(54) ANTIREFLECTIVE ARTICLE, IMAGE DISPLAY DEVICE, AND PRODUCTION MOLD FOR ANTIREFLECTIVE ARTICLE

(71) Applicant: DAI NIPPON PRINTING CO., LTD., Tokyo (JP)

(72) Inventors: Yoshihiro Fukui, Tokyo (JP); Hironori Kamiyama, Tokyo (JP); Yuichi Miyazaki, Tokyo (JP); Takafumi Shibata, Tokyo (JP); Masafumi Tanaka, Tokyo (JP); Kazuo Matsufuji, Tokyo (JP); Yuri Shimozaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 14 days.

(21) Appl. No.: 14/412,135

(22) PCT Filed: Jul. 31, 2013

(86) PCT No.: PCT/JP2013/070733
§ 371 (c)(1),
(2) Date: Dec. 30, 2014

(87) PCT Pub. No.: WO2014/021377
PCT Pub. Date: Feb. 6, 2014

(65) Prior Publication Data
US 2015/0168609 A1 Jun. 18, 2015

(30) Foreign Application Priority Data

Jul. 31, 2012 (JP) .............................. 2012-169745
Jul. 31, 2012 (JP) .............................. 2012-169746
Jul. 31, 2012 (JP) .............................. 2012-169747
Feb. 18, 2013 (JP) .............................. 2013-028943

(51) Int. Cl.
*G02B 1/10* (2015.01)
*G02B 1/118* (2015.01)
(Continued)

(52) U.S. Cl.
CPC ............. *G02B 1/118* (2013.01); *B29C 33/424* (2013.01); *B29C 59/022* (2013.01); *G02B 1/14* (2015.01); *B29C 59/046* (2013.01); *G02F 2201/38* (2013.01)

(58) Field of Classification Search
CPC ....... G02B 1/118; G02B 1/14; B29C 33/424; B29C 59/022; B29C 59/046; G02F 2201/38
USPC .................................................. 359/601, 613
See application file for complete search history.

(56) References Cited

U.S. PATENT DOCUMENTS

| 4,013,465 A | 3/1977 | Clapham et al. |
| 2003/0205475 A1 | 11/2003 | Sawitowski |

(Continued)

FOREIGN PATENT DOCUMENTS

| JP | A-50-70040 | 6/1975 |
| JP | A-2003-531962 | 10/2003 |

(Continued)

OTHER PUBLICATIONS

Oct. 8, 2013 Search Report issued in International Patent Application No. PCT/JP2013/070733 (with translation).

*Primary Examiner* — Bumsuk Won
*Assistant Examiner* — William R Alexander
(74) *Attorney, Agent, or Firm* — Oliff PLC

(57) ABSTRACT

In order to improve the scratch resistance of an antireflective article having a moth-eye structure, an antireflective article is provided that has fine protrusions densely arranged therein, has the interval between adjacent fine protrusions being no more than the shortest wavelength for an electromagnetic wavelength band for antireflection, and wherein: the fine protrusions are arranged in a non-lattice shape in the planar view; and mesh division lines formed upon the valley sections between each adjacent fine protrusions and surrounding each fine protrusion match Voronoi tessellation having the center of gravity of the fine protrusions, in the planar view as the generating point therefor, in at least one area of the antireflective article.

15 Claims, 24 Drawing Sheets

(51) Int. Cl.
  *B29C 59/02* (2006.01)
  *B29C 33/42* (2006.01)
  *G02B 1/14* (2015.01)
  *B29C 59/04* (2006.01)

(56) References Cited

U.S. PATENT DOCUMENTS

| | | |
|---|---|---|
| 2006/0158972 A1 | 7/2006 | Kimura |
| 2010/0098859 A1* | 4/2010 | Schumaker ............ B82Y 10/00 427/256 |
| 2010/0119782 A1* | 5/2010 | Ohgane ............ B29D 11/00326 428/174 |
| 2011/0051249 A1* | 3/2011 | Endoh .................... G02B 1/118 359/599 |
| 2011/0235181 A1* | 9/2011 | Hayashibe ............ G02B 1/118 359/577 |
| 2012/0069443 A1 | 3/2012 | Taguchi et al. |
| 2012/0081793 A1* | 4/2012 | Taguchi ................ G02B 1/118 359/601 |
| 2012/0176681 A1* | 7/2012 | Chang ................ C23C 18/1225 359/614 |

FOREIGN PATENT DOCUMENTS

| | | |
|---|---|---|
| JP | A-2006-53511 | 2/2006 |
| JP | A-2006-201371 | 8/2006 |
| JP | B2-4632589 | 2/2011 |
| JP | A-2011-237469 | 11/2011 |
| JP | A-2012-14083 | 1/2012 |
| JP | A-2012-14084 | 1/2012 |
| JP | A-2012-37670 | 2/2012 |
| JP | A-2012-118501 | 6/2012 |
| WO | WO 2010/143503 A1 | 12/2010 |

\* cited by examiner

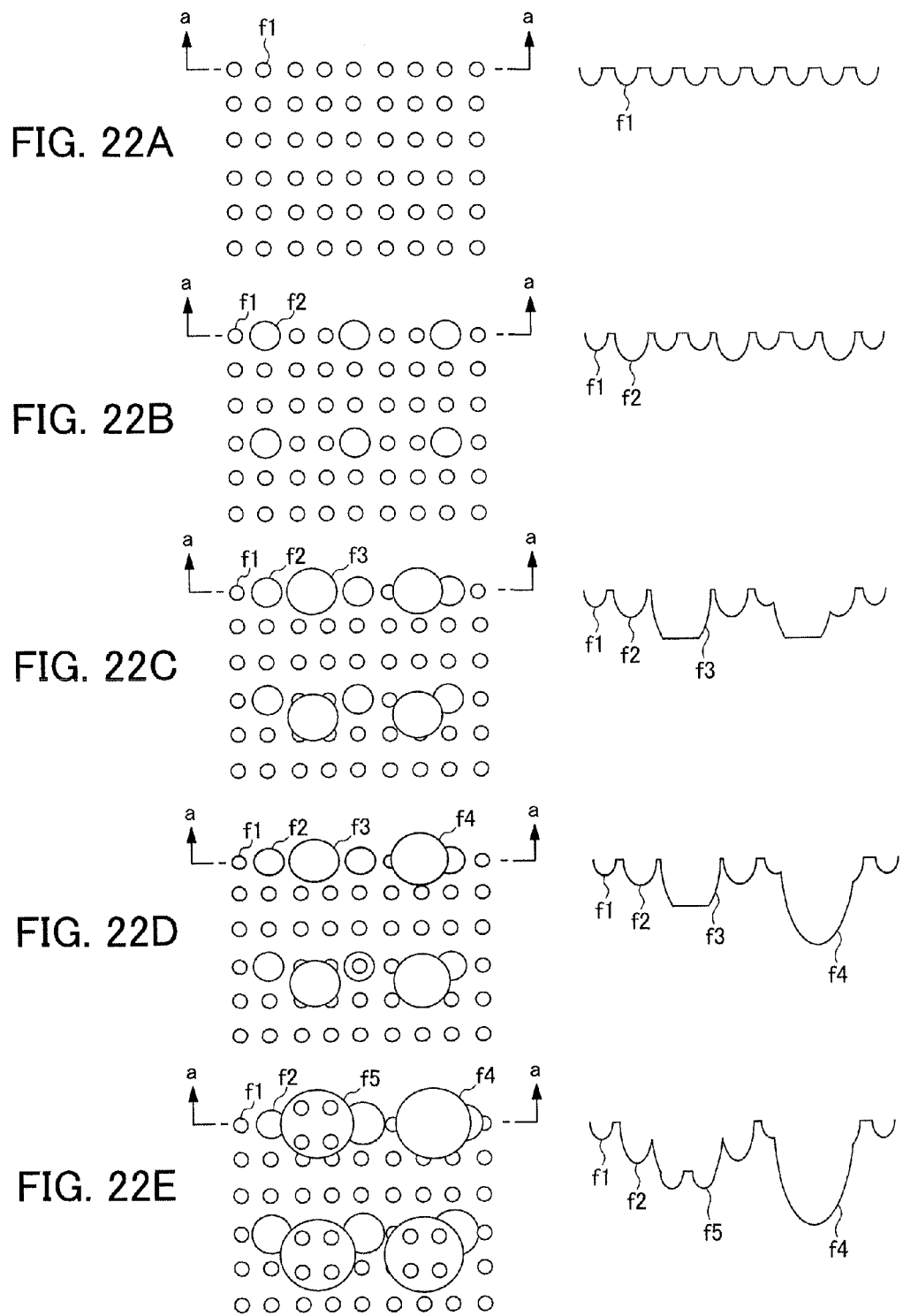

ANTIREFLECTIVE ARTICLE, IMAGE DISPLAY DEVICE, AND PRODUCTION MOLD FOR ANTIREFLECTIVE ARTICLE

TECHNICAL FIELD

The present invention relates to an antireflective article which prevents reflections by arranging a number of fine protrusions closely to each other at an interval no more than a shortest wavelength of a wavelength band of electromagnetic waves of which reflections are to be prevented.

BACKGROUND ART

In recent years, various methods for manufacturing an antireflective article which is a film-shaped antireflective article by arranging a number of fine protrusions closely to each other on the surface of a transparent base (transparent film) to prevent reflections have been proposed (see Patent Documents 1 to 3). These methods utilize the properties of a so-called moth-eye structure to change the refractive index to incident light continuously in a thickness distribution of a substrate to eliminate interfaces where the refractive indexes are discontinuous to thereby prevent reflections.

In an antireflective article having this moth-eye structure, fine protrusions are arranged closely to each other so that an interval d between adjacent fine protrusions is no more than a shortest wavelength $\lambda$min of a wavelength band of electromagnetic waves of which reflections are to be prevented (d≤$\lambda$min). Moreover, each fine protrusion is manufactured so that the fine protrusion stands vertically on the transparent base and the cross-sectional area thereof decreases (the fine protrusion is tapered) as the fine protrusion advances from the transparent base toward a distal end.

However, an antireflective article having this type of moth-eye structures has a problem in that the scratch resistance thereof is not sufficient for practical use. That is, for example, when another object comes into contact with the antireflective article, the anti-reflection function deteriorates in a local region, and cloudy spots, scratches, or the like appear in the contacting region, which may cause appearance defects.

Patent Document 1: Japanese Unexamined Patent Application, Publication No. S50-70040
Patent Document 2: Japanese Unexamined Patent Application (Translation of PCT Application), Publication No. 2003-531962
Patent Document 3: Japanese Patent No. 4632589

DISCLOSURE OF THE INVENTION

Problems to be Solved by the Invention

The present invention has been made in view of such circumstances, and an object thereof is to improve the scratch resistance of an antireflective article having the moth-eye structure as compared to the conventional antireflective article.

Means for Solving the Problems

As the result of repeated careful examinations to solve the problems, the present inventors have conceived an ideal of arranging fine protrusions that form an antireflective article in a non-lattice form in a plan view and arranging the fine protrusions in a partial region of the antireflective article so that a net-like division line formed on a trough portion between adjacent fine protrusions so as to surround the respective fine protrusions is identical to a Voronoi tessellation line of which the generating point is at the center of gravity in a plan view, of the respective fine protrusions and have completed the present invention.

Specifically, the present invention provides the following inventions.

(1) An antireflective article in which fine protrusions are disposed closely to each other and an interval between adjacent fine protrusions is no more than a shortest wavelength in a wavelength band of electromagnetic waves of which reflections are to be prevented, wherein the fine protrusions are arranged in a non-lattice form in a plan view, in at least a partial region of the antireflective article, net-like division lines formed on a trough portion between adjacent fine protrusions so as to surround the fine protrusions are identical to Voronoi tessellation lines of which the generating points are at centers of gravity in the plan view of the fine protrusions.

According to (1), fine protrusions are arranged on the surface of the antireflective article in a non-lattice form, and in at least a partial region of the antireflective article, net-like division lines formed on a trough portion between adjacent fine protrusions so as to surround the fine protrusions are identical to Voronoi tessellation lines of which the generating points are at centers of gravity in the plan view of the fine protrusions. Since the fine protrusions are arranged in the non-lattice form, even when partial fine protrusions are damaged, it is possible to suppress the spread of a damaged region. Moreover, since the net-like division lines formed so as to surround the fine protrusions are identical to the Voronoi tessellation lines of which the generating points are at the centers of gravity in the plan view of the fine protrusions, it is possible to provide a sufficient anti-reflection performance while preventing the occurrence of noise recognized as a pattern.

(2) The antireflective article according to (1), wherein in a region of 20% or more of the surface of the antireflective article, the net-like division lines are identical to the Voronoi tessellation lines.

According to (2), since the effect of the fine protrusion group having the non-lattice form unique to the present invention is particularly dominant, even when a portion of the fine protrusions of the antireflective article is damaged, it is possible to suppress the spread of a damaged region while maintaining an anti-reflection effect and to provide more satisfactory scratch resistance.

(3) The antireflective article according to (1) or (2), wherein in the net-like division lines identical to the Voronoi tessellation lines, an average number of Voronoi tessellation lines of which the starting points are at Voronoi branch points is 3 or more and smaller than 4.

According to (3), since the Voronoi cells formed by the Voronoi tessellation lines occupy a predetermined proportion, the fine protrusions has a predetermined irregular shape or arrangement. Thus, it is possible to realize an ideal arrangement of the protrusion distribution corresponding to the application of the present invention. Specifically, due to the irregular arrangement of the Voronoi cells, since the acting line of external force is suppressed from reaching protrusions continuously. Thus, it is possible to suppress the damages to fine protrusions when external force is applied and to improve the scratch resistance of the antireflective article.

(4) The antireflective article according to any one of (1) to (3), wherein at least a portion of the fine protrusions is a multi-peak fine protrusion having a plurality of peaks.

According to (4), since fine protrusions (hereinafter referred to as "multi-peak fine protrusions") having a plurality of peaks having excellent mechanical strength as compared to fine protrusions (hereinafter referred to as "mono-peak fine protrusions") having only one peak are formed in the antireflective article, it is possible to prevent damages to protrusions when impact is applied to the antireflective article as compared to when only mono-peak fine protrusions are formed. Due to this, it is possible to suppress local deterioration of the anti-reflection function and to suppress the occurrence of appearance defects. Moreover, even when the fine protrusions are damaged, it is possible to reduce the area of the damaged region. Due to this, it is possible to suppress local deterioration of the anti-reflection function and to suppress the occurrence of appearance defects.

(5) The antireflective article according to any one of (1) to (4), wherein at least a portion of the fine protrusions forms a convex protrusion group which includes one apex fine protrusion and a plurality of surrounding fine protrusions which is formed around and adjacent to the apex fine protrusion and has a smaller height than the apex fine protrusion.

According to (5), since the convex protrusion group is formed such that the plurality of surrounding fine protrusions having a smaller height is provided around and adjacent to one apex fine protrusion, when impact is applied from various members contacting the antireflective article, the impact is absorbed mainly by the apex fine protrusion. Thus, it is possible to prevent the breakage of the plurality of adjacent surrounding fine protrusions, caused by the impact and to prevent the damage to all fine protrusions in a certain range. Due to this, it is possible to suppress deterioration of the anti-reflection function in a local region and to suppress the occurrence of appearance defects.

(6) The antireflective article according to (5), wherein the fine protrusions that form one convex protrusion group have heights which vary in a standard deviation range of 10 nm or more and 50 nm or smaller.

According to (6), it is possible to prevent the surrounding fine protrusion from making contact with the surface of various members more reliably. Due to this, it is possible to prevent the damage to all fine protrusions in a certain range.

(7) The antireflective article according to (5) or (6), the plurality of surrounding fine protrusions has such a height that decreases as it departs from the apex fine protrusion.

According to (7), the entire convex protrusion group made up of a plurality of fine protrusions provide the effect corresponding to a single fine protrusion of the so-called moth-eye structure. Due to this, it is possible to obtain a sufficient anti-reflection effect while suppressing local deterioration of the anti-reflection function and the occurrence of appearance defects as compared to when only approximately uniform fine protrusions are present.

(8) The antireflective article according to any one of (5) to (7), wherein in an envelope surface of the convex protrusion group, which is a portion of a curved surface that includes peaks of the fine protrusions and is a bell-shaped curved surface of which the width increases as it advances toward a lower end from the peak of the apex fine protrusion, a largest distance between the lower ends of the envelope surface is 780 nm or smaller.

According to (8), the entire convex protrusion group made up of a plurality of fine protrusions performs the same function as a single fine protrusion that forms the moth-eye structure and provides the anti-reflection effect.

(9) The antireflective article according to (8), wherein the largest distance between the lower ends is 380 nm or smaller.

According to (9), the entire convex protrusion group made up of a plurality of fine protrusions performs the same function as a single fine protrusion that forms the moth-eye structure and provides an anti-reflection effect in all wavelengths of the visible wavelength band.

(10) The antireflective article according to any one of (5) to (9), wherein a proportion of fine protrusions that form the convex protrusion group among the fine protrusions is 10% or more.

According to (10), since the convex protrusion group is included, it is possible to provide the effect of suppressing local deterioration in the anti-reflection function and the occurrence of appearance defects more stably.

(11) The antireflective article according to any one of (1) to (10), wherein at least a portion of the fine protrusions forms an annular fine protrusion group which includes an inner fine protrusion and a plurality of outer fine protrusions which surround the inner fine protrusion and have a larger height than the inner fine protrusion.

According to (11), since the outer fine protrusions having a larger height are provided so as to surround one inner fine protrusion, when impact is applied from various members contacting the antireflective article, the plurality of outer fine protrusions absorbs the impact. Thus, it is possible to prevent the breakage of at least the one inner fine protrusion, caused by the impact and to prevent the damage to all fine protrusions in a certain range. Due to this, it is possible to suppress deterioration of the anti-reflection function in a local region and to suppress the occurrence of appearance defects.

(12) The antireflective article according to (11), wherein the fine protrusions that form one annular fine protrusion group have heights which vary in a standard deviation range of 10 nm or more and 50 nm or smaller.

According to (12), it is possible to prevent the inner fine protrusion from making contact with the surface of various members more reliably. Due to this, it is possible to prevent the damage to all fine protrusions in a certain range.

(13) The antireflective article according to any one of (11) to (12), wherein a proportion of fine protrusions that form the annular fine protrusion group among the fine protrusions is 7% or more.

According to (13), since the annular fine protrusion group is included, it is possible to provide the effect of suppressing local deterioration in the anti-reflection function and the occurrence of appearance defects more stably.

(14) An image display device in which the antireflective article according to any one of (1) to (13) is disposed on a light emission surface of an image display panel.

According to (14), it is possible to provide an image display device including the antireflective article having improved scratch resistance.

(15) An antireflective article production mold provided for producing an antireflective article in which, fine protrusions are disposed closely to each other, an interval between adjacent fine protrusions is no more than a shortest wavelength in a wavelength band of electromagnetic waves of which reflections are to be prevented, and the fine protrusions are arranged in a non-lattice form in a plan view, and in at least a partial region of the antireflective article, net-like division lines formed on a trough portion between adjacent fine protrusions so as to surround the fine protrusions are identical to Voronoi tessellation lines of which the generating points are at centers of gravity in the plan view of the fine protrusions, wherein the antireflective article production mold is produced so that micro-pores corresponding to the fine protrusions are arranged closely to each other.

According to (15), in the antireflective article produced using the mold, fine protrusions are arranged on the surface of the antireflective article in a non-lattice form, and in at least a partial region of the antireflective article, net-like division lines formed on a trough portion between adjacent fine protrusions so as to surround the fine protrusions are identical to Voronoi tessellation lines of which the generating points are at centers of gravity in the plan view of the fine protrusions. Due to this, even when a partial fine protrusion is damaged, it is possible to suppress the spread of a damaged region. As a result, it is possible to suppress deterioration in the anti-reflection function and to suppress the occurrence of appearance defects.

(16) The antireflective article production mold according to (15), wherein a portion of the fine protrusions forms a convex protrusion group which includes one apex fine protrusion and a plurality of surrounding fine protrusions which is formed around and adjacent to the apex fine protrusion and has a smaller height than the apex fine protrusion.

According to (16), in the antireflective article produced using the mold, since the convex protrusion group is formed in the antireflective article, when an impact is applied to the antireflective article, it is possible to prevent all protrusions from being damaged in a certain range. Due to this, it is possible to suppress local deterioration of the anti-reflection function and to suppress the occurrence of appearance defects. As a result, it is possible to suppress local deterioration of the anti-reflection function and to suppress the occurrence of appearance defects.

(17) The antireflective article production mold according to (15) or (16), wherein a portion of the fine protrusions forms an annular fine protrusion group which includes an inner fine protrusion and a plurality of outer fine protrusions which surround the inner fine protrusion and have a larger height than the inner fine protrusion.

According to (17), in the antireflective article produced using the mold, since the annular fine protrusion group is formed in the antireflective article, when an impact is applied to the antireflective article, it is possible to prevent all protrusions from being damaged in a certain range. Due to this, it is possible to suppress local deterioration of the anti-reflection function and to suppress the occurrence of appearance defects. As a result, it is possible to suppress local deterioration of the anti-reflection function and to suppress the occurrence of appearance defects.

Effects of the Invention

It is possible to provide an antireflective article having the moth-eye structure, capable of improve the scratch resistance while maintaining a sufficient anti-reflection performance.

BRIEF DESCRIPTION OF THE DRAWINGS

FIGS. 22A to 22E are diagrams provided for describing the steps of manufacturing a roll plate according to a third embodiment.

EXPLANATION OF REFERENCE NUMERALS

1: Antireflective article
2: Base
4: Ultraviolet-curable resin layer (Receiving layer)
5, 5A, 5B: Fine protrusion
6: Uneven surface
10: Production step
12: Die
13: Roll plate
14, 15: Roller
p: Maximum point
b: Voronoi tessellation line
g: Groove

PREFERRED MODE FOR CARRYING OUT THE INVENTION

First Embodiment

Figure 1:
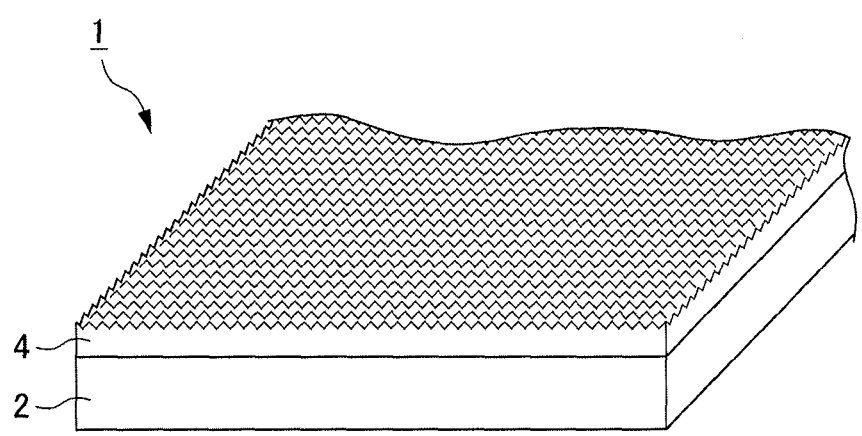
FIG. 1 is a schematic perspective view illustrating an antireflective article according to a first embodiment of the present invention.

FIG. 1 is a diagram (schematic perspective view) illustrating an antireflective article according to a first embodiment of the present invention. The antireflective article 1 is an antireflective article that is generally formed in a film shape. In an image display device according to the present embodiment, the antireflective article 1 is held by being attached to a front surface of an image display panel, and reflections of external light such as sunlight or lamp light from the screen are suppressed by the antireflective article 1 to improve visibility. The shape of the antireflective article is not limited to a flat film shape, but the antireflective article may be formed in a flat sheet shape or a flat plate shape (the shapes are referred to as film, sheet, and plate shapes in ascending order of the relative thicknesses). Moreover, the film shape, the sheet shape, and the plate shape may have a curved shape or a stereoscopic shape instead of the flat shape. Furthermore, antireflective articles having the stereoscopic shapes of various lenses and various prisms may be appropriately employed according to the applications.

Here, the antireflective article 1 is manufactured by arranging a number of fine protrusions closely to each other on the surface of a base 2 which is a transparent film. In the present specification, the plurality of fine protrusions arranged closely to each other is collectively referred to as a fine protrusion group. Here, various resin films can be used as the base 2, and examples of the resin include cellulose (fibrin) resins such as triacetylcellulose (TAC), acrylic resins such as polymethyl methacrylate (PMMA), polyester resins such as polyethylene terephthalate (PET), polyolefin resins such as polypropylene (PP), vinyl resins such as polyvinyl chloride (PVC), and transparent resins such as polycarbonate (PC). As described above, the shape of the antireflective article is not limited to the film shape and various other shapes can be employed. Thus, the base 2 may be formed, for example, of glass such as soda glass, potash glass, or lead glass, ceramics such as PLZT, and various transparent inorganic materials such as quartz and fluorite, other than these materials according to the shape of the antireflective article.

In the antireflective article 1, a non-cured resin layer (hereinafter appropriately referred to as a ultraviolet-curable resin layer 4 or a receiving layer) 4 which serves as a receiving layer having a micro-uneven shape, formed from a fine protrusion group is formed on the base 2, and the receiving layer 4 is cured in a state where a molding surface of a molding mold is in contact with the surface of the receiving layer 4, whereby fine protrusions are arranged closely to each other on the surface of the base 2. The antireflective article 1 is manufactured so that the refractive index changes gradually in the thickness distribution with the aid of the uneven shape created by the fine protrusions so as to suppress reflections of incident light in a wide wavelength range with the aid of the properties of a moth-eye structure. In the present specification, convex portions that form the peaks of the multi-peak fine protrusions and the mono-peak fine protrusions will be appropriately referred to as peaks.

In this way, the fine protrusions manufactured in the antireflective article 1 are arranged so that the interval d between adjacent fine protrusions is no more than a shortest wavelength $\Lambda$min of a wavelength band of electromagnetic waves of which reflections are to be prevented (d≤$\Lambda$min). In the present embodiment, since the antireflective article is mainly aimed to be disposed on an information processing device to improve the visibility, the shortest wavelength is set to the shortest wavelength (380 nm) of a visible light region by taking individual differences and watching conditions into consideration and the interval d is set to 100 nm to 300 nm by taking variations into consideration. Moreover, the adjacent fine protrusions associated with the interval d are so-called neighboring fine protrusions and are protrusions which are in contact with the skirt portions of fine protrusions which are the root portions close to the base 2. In the antireflective article 1, since the fine protrusions are arranged closely to each other, when lines are created so as to follow the trough portions between fine protrusions sequentially, a net-like pattern obtained by connecting a number of polygonal regions surrounding the respective fine protrusions is created. In the present specification, the lines that form such a net-like pattern is referred to as "net-like division lines". The adjacent fine protrusions associated with the interval d are protrusions that share a partial line that constitutes the net-like division lines.

More specifically, the fine protrusions are defined as follows. According to anti-reflection techniques based on the moth-eye structure, an effective refractive index at an interface between a transparent base surface and a medium adjacent to the surface is changed continuously in the thickness distribution to prevent reflections. Thus, the fine protrusions need to satisfy predetermined conditions. As for the interval of protrusions which is one of the conditions, as disclosed in Japanese Unexamined Patent Application, Publication No. S50-70040, Japanese Patent No. 4632589, and the like, for example, when fine protrusions are arranged regularly at a predetermined period, the interval d between adjacent fine protrusions is the period P (d=P). Due to this, when the longest wavelength and the shortest wavelength of a visible wavelength band are $\lambda$max and $\lambda$min, respectively, the minimum condition required for achieving an anti-reflection effect in the longest wavelength of the visible wavelength band is $\Lambda$min=$\lambda$max, and thus, P≤$\lambda$max. Thus, the minimum condition required for achieving the anti-reflection effect in all wavelengths of the visible wavelength band is $\Lambda$min=$\lambda$min, and thus, P≤$\lambda$min.

Although the wavelengths $\lambda$max and $\lambda$min may vary depending on observation conditions, light intensity (brightness), individual differences, and the like, the wavelengths are typically set such that $\lambda$max=780 nm and $\lambda$min=380 nm. Due to this, a preferred condition for achieving the anti-reflection effect more reliably in all wavelengths of the visible wavelength band is d≤300 nm, and a more preferred condition is d<200 nm from the perspective of suppressing cloudiness when seen in an oblique direction (a direction of 45° or more with respect to the normal to the surface of the base 2). In order to achieve the anti-reflection effect and secure isotropy of reflectance (low angular dependence), the lower limit of the period d is generally set to d≥50 nm, and preferably, d≥100 nm. In contrast, the height H of a protrusion is set to H≥0.2×$\lambda$max=156 nm (when $\lambda$max=780 nm) from the perspective of achieving a sufficient anti-reflection effect.

Figure 2:
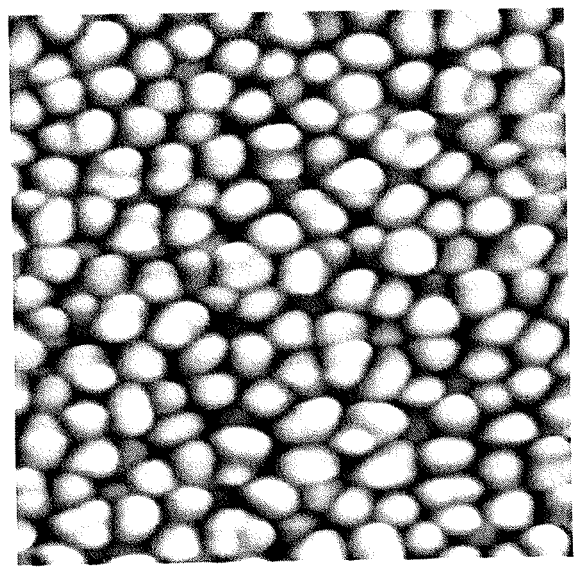
FIG. 2 a diagram provided for describing adjacent protrusions.

However, as in the antireflective article of the present invention, when the fine protrusions are arranged irregularly, the interval d between adjacent fine protrusions may vary. More specifically, as illustrated in FIG. 2, in a plan view when seen in a direction normal to the front or rear surface of a base, when fine protrusions are not arranged regularly at a predetermined period, it may be unable to define the interval d between adjacent protrusions depending on a repetition period P of the protrusions and even the concept of adjacent protrusions becomes ambiguous. Thus, in such a case, the interval is calculated in the following manner.

(1) First, an in-plane arrangement (plan-view shape of a protrusion arrangement) of protrusions is detected using an atomic force microscope (AFM) or a scanning electron microscope (SEM). FIG. 2 is an enlarged picture obtained by an AFM.

Figure 3:
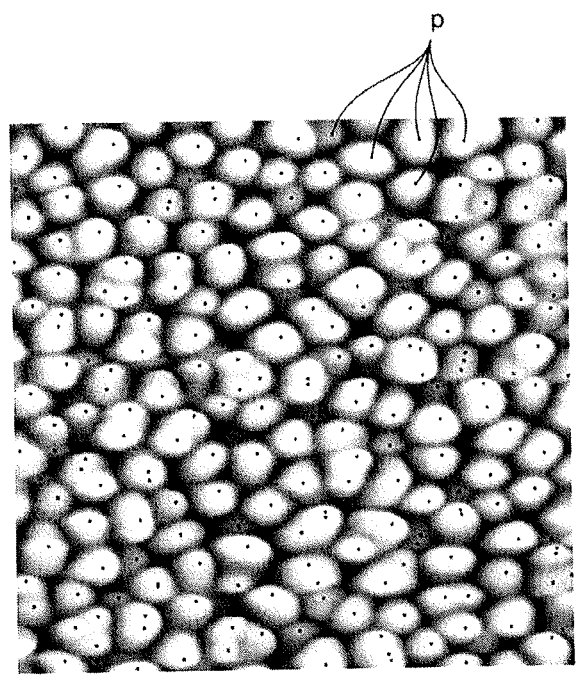
FIG. 3 is a diagram provided for describing maximum points.

(2) Subsequently, the maximum height points (hereinafter referred to simply as "maximum points") of respective protrusions are detected from the obtained in-plane arrangement. Various methods can be used as a method of obtaining the maximum points. Examples of the method include (a) a method of sequentially comparing plane coordinates on the enlarged picture of the plan-view shape with height data obtained from the corresponding cross-sectional shape to obtain the maximum points and (b) a method of creating a 2-dimensional image from the data of a height distribution in plane coordinates on the base obtained by the AFM to obtain an enlarged plan-view picture and processing the enlarged plan-view picture to obtain the maximum points. FIG. 2 is an enlarged picture obtained by an AFM (in which an image density corresponds to a height), and FIG. 3 is a diagram illustrating the detection results of maximum points obtained by processing the image data of the enlarged picture illustrated in FIG. 2, in which black dots are the maximum points of fine protrusions. In this processing, the image data was processed using a Gaussian low-pass filter which uses 4.5 by 4.5 pixels to prevent detections errors in the maximum point caused by noise. Moreover, the image data was sequentially scanned by a maximum point detection filter which uses 8 by 8 pixels to obtain maximum points at intervals of 1 nm (=1 pixel).

Figure 4:
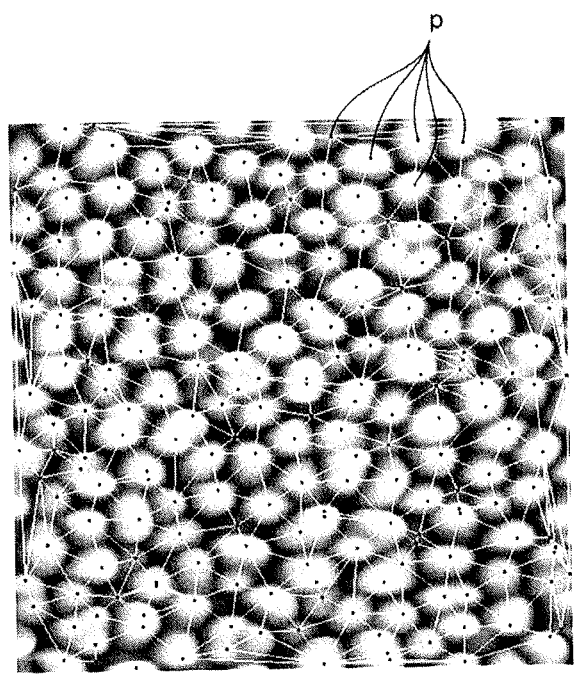
FIG. 4 is a diagram illustrating a Delaunay diagram.
Figure 5:
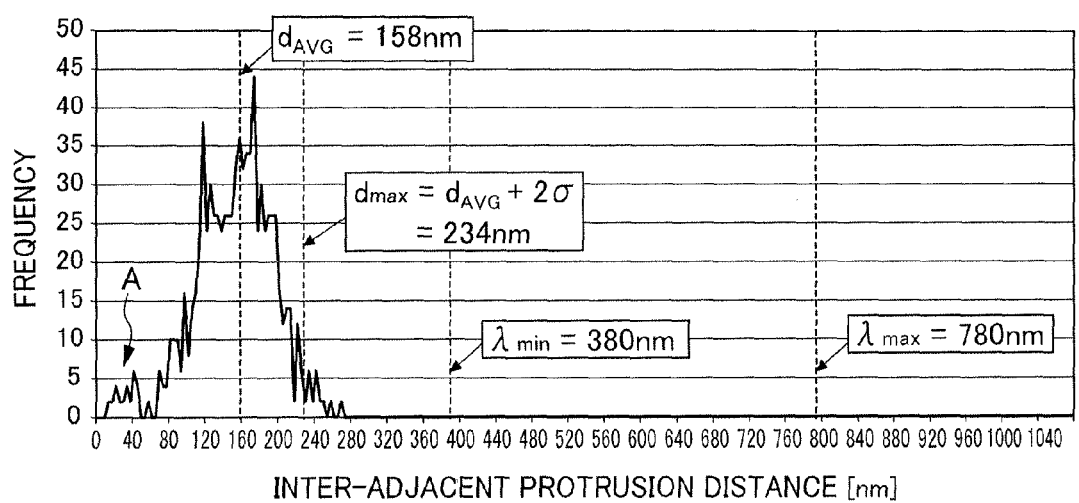
FIG. 5 is a frequency distribution diagram provided for measuring an inter-adjacent protrusion distance.

(3) Subsequently, a Delaunay diagram which uses the detected maximum points as generating points is created. Here, the Delaunay diagram is a net-like figure made up of a cluster of triangles obtained by applying Voronoi tessellation using the maximum points as generating points, defining generating points to which Voronoi cells are adjacent as adjacent generating point, and connecting the adjacent generating points by lines. Each triangle is called a Delaunay triangle, and each side (the line that connects the adjacent generating points) of the triangle is called a Delaunay line. FIG. 4 is a diagram in which the Delaunay diagram (the diagram depicted by white lines) obtained from FIG. 3 is superimposed on the original image in FIG. 3. The Delaunay diagram is in a reciprocal relation with the Voronoi diagram. Moreover, the Voronoi tessellation means dividing a plane into net-like figures made up of a cluster of closed polygons that are defined by Voronoi tessellation lines b which are perpendicular bisectors of the lines (Delaunay lines) that connect the respective adjacent generating points which are the maximum points p of respective fine protrusions. The net-like figures obtained by Voronoi tessellation are a Voronoi diagram, and each closed region is a Voronoi cell. Moreover, points which are the starting points of the Voronoi tessellation lines and are peaks of polygons that form the respective Voronoi cells are referred to as Voronoi branch points.

Figure 6:
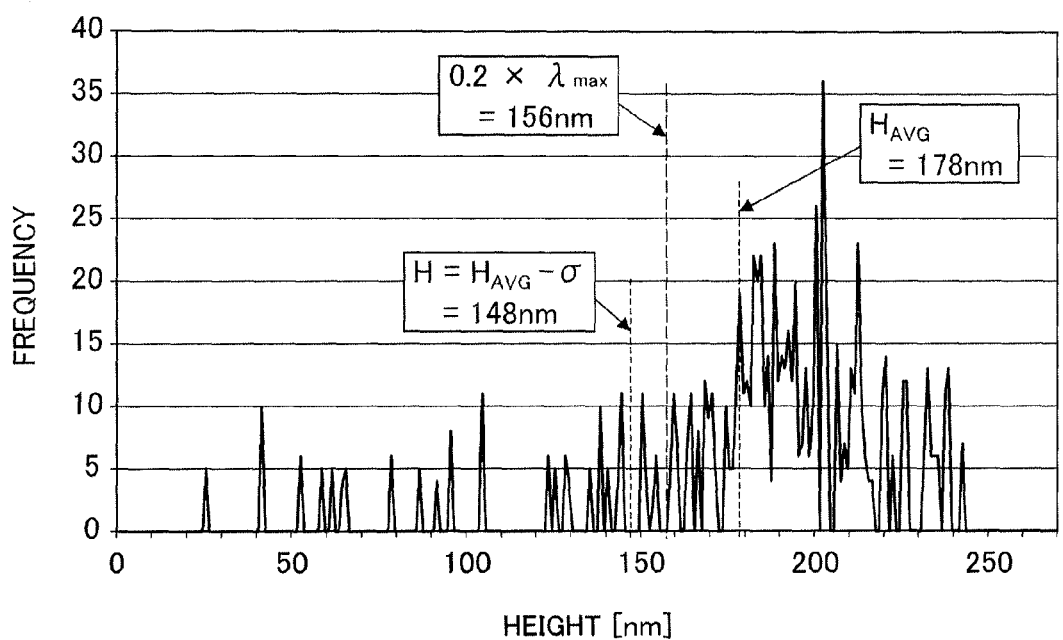
FIG. 6 is a frequency distribution diagram provided for describing a very small height.

(4) Subsequently, a frequency distribution of the line lengths of the respective Delaunay lines (that is, a frequency distribution of the distance (hereinafter referred to an "inter-adjacent protrusion distance") between the adjacent maximum points) is calculated. FIG. 6 is a histogram of the frequency distribution created from the Delaunay diagram of FIG. 4. As illustrated in FIG. 2 and FIGS. 10A to 10C, when concave portions such as grooves are present in the apex of a protrusion or the apex is split into a plurality of crests, data associated with a microscopic structure in which a concave portion is present in the apex of the protrusion and data associated with a microscopic structure in which the apex is split into a plurality of crests are eliminated from the obtained frequency distribution to extract the data associated with the protrusions themselves. In this way, a frequency distribution associated with the protrusions themselves is created.

Specifically, in the microscopic structure in which a concave portion is resent in the apex of the protrusion and the microscopic structure associated with a multi-peak fine protrusion in which the apex is split into a plurality of crests, an inter-adjacent maximum point distance is remarkably different from a range of numerical values of mono-peak fine protrusions which do not have such a microscopic structure. Due to this, the data of protrusions themselves is extracted by eliminating the corresponding data using this feature to detect the frequency distribution. More specifically, approximately five to twenty adjacent mono-peak fine protrusions are selected from the enlarged plan-view picture of a fine protrusion (group) illustrated in FIG. 2, for example, the values of the inter-adjacent maximum point distances are extracted as samples, and values (generally, data of which the value is no more than an average inter-adjacent maximum point distance obtained from the samples) that obviously deviate from the numerical range obtained from the samples are eliminated to detect the frequency distribution. In the example of FIG. 6, the data (small peaks at the left end indicated by arrow A) of which the inter-adjacent maximum point distance is no more than 56 nm is eliminated. FIG. 6 illustrates a frequency distribution before such an elimination process is applied. Such an elimination process may be executed by setting the maximum point detection filter.

(5) An average $d_{AVG}$ and a standard deviation $\sigma$ are calculated from the frequency distribution of the inter-adjacent protrusion distance d calculated in this manner. Here, when the average $d_{AVG}$ and the standard deviation $\sigma$ are calculated by regarding the frequency distribution obtained in this manner as a normal distribution; the average $d_{AVG}$=158 nm and the standard deviation $\sigma$=38 nm in the example of FIG. 6. Due to this, the maximum value of the inter-adjacent protrusion distance d is set to dmax=$d_{AVG}$+2$\sigma$, and in this example, dmax=234 nm.

Figure 7:
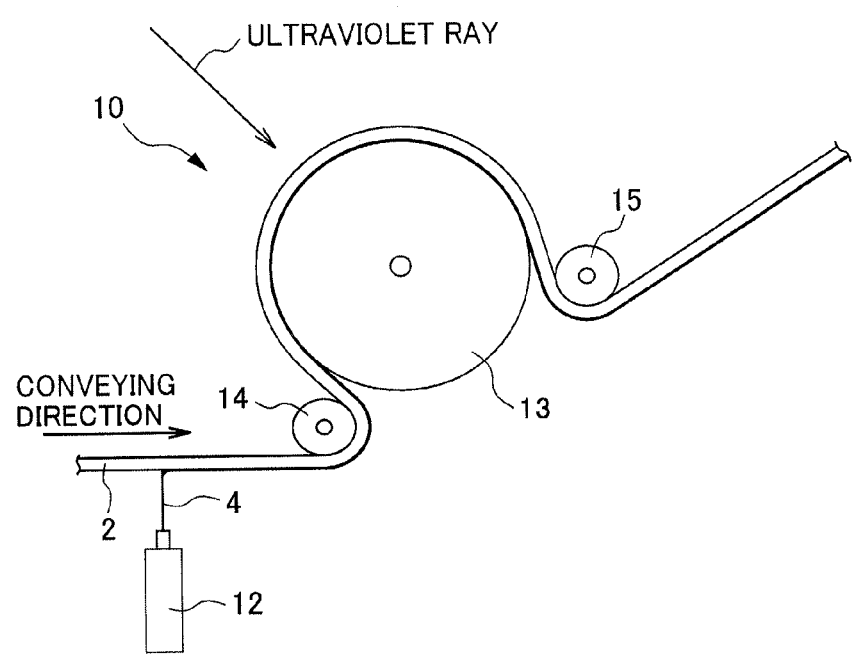
FIG. 7 is a diagram illustrating the steps of producing the antireflective article of FIG. 1.

The height of the protrusion is defined according to the same method. In this case, a difference between relative heights of respective maximum point positions from a specific reference position is acquired from the maximum points obtained in (2) to create a histogram. FIG. 7 is a diagram illustrating a histogram of the frequency distribution of a protrusion height H using the root position of a protrusion as a reference (height 0), obtained in this manner. An average $H_{AVG}$ and a standard deviation $\sigma$ of protrusion heights are calculated from the frequency distribution histogram. Here, in the example of FIG. 7, the average $H_{AVG}$=178 nm and the standard deviation $\sigma$=30 nm. Due to this, in this example, the protrusion heights have an average $H_{AVG}$=178 nm. In the histogram of the protrusion height H illustrated in FIG. 7, a multi-peak fine protrusion has a plurality of peaks, and one protrusion has a plurality of items of data. Thus, in this case, the frequency distribution is calculated by employing a highest peak among the plurality of peaks of which the feet belong to the same fine protrusion as a protrusion height of the fine protrusion.

The reference position used when measuring the protrusion height is set such that a trough bottom (a minimum height point) between adjacent fine protrusions is the reference of the height 0. However, when the height itself of the trough bottom varies depending on a position (for example, as will be described in FIG. 24, the height of the trough bottom has an undulation having a larger cycle than the inter-adjacent protrusion distance of fine protrusions), the protrusion height is calculated in the following manner. (1) First, an average of the heights of respective trough bottoms measured from the front or rear surface of the base 2 is calculated among surfaces where the averages converge sufficiently. (2) Subsequently, a surface which has the average height and which is parallel to the front or rear surface of the base 2 is selected as a reference surface. (3) After that, the heights of respective fine protrusions from the reference surface are calculated again using the reference surface as the height 0.

When protrusions are arranged irregularly, the maximum value $dmax=d_{AVG}+2\sigma$ of the inter-adjacent protrusion distances and the average $H_{AVG}$ of the protrusion heights calculated in this manner need to satisfy the conditions when the protrusions are arranged regularly. Specifically, the condition of the inter-fine protrusion distance for achieving the anti-reflection effect is $dmax \leq \Lambda min$. Since the minimum condition required for achieving the anti-reflection effect in the longest wavelength of the visible wavelength band is $\Lambda min = \lambda max$, $dmax \leq \lambda max$. Thus, since the minimum condition required for achieving the anti-reflection effect in all wavelengths of the visible wavelength band is $\Lambda min = \lambda min$, $dmax \leq \lambda min$. Moreover, a preferred condition for achieving the anti-reflection effect more reliably in all wavelengths of the visible wavelength band is $dmax \leq 300$ nm, and a more preferred condition is $dmax \leq 200$ nm. Further, in order to achieve the anti-reflection effect and secure isotropy of reflectance (low angular dependence), $d \geq 50$ nm, and preferably, $d \geq 100$ nm. Moreover, the protrusion height is set to $H \geq 0.2 \times \lambda max = 156$ nm (when $\lambda max = 780$ nm) in order to achieve a sufficient anti-reflection effect.

Referring to the example of FIG. 2 to FIG. 6, $dmax=234$ nm$<\lambda max=780$ nm, and the condition of $dmax \leq \lambda max$ is satisfied. Thus, it is possible to achieve a sufficient anti-reflection effect. Moreover, since the shortest wavelength $\lambda min$ of the visible wavelength band is 380 nm, the minimum condition, $dmax \leq \lambda min$ for achieving an anti-reflection effect in the entire wavelength band of the visible light is satisfied. Moreover, since the average protrusion height $H_{AVG}=178$ nm, the average protrusion height $H_{AVG} \geq 0.2 \times \lambda max = 156$ nm (when the longest wavelength of the wavelength band of the visible light is 780 nm), the condition of the protrusion height for achieving a sufficient anti-reflection effect is also satisfied. Since the standard deviation $\sigma=30$ nm, a relation of $H_{AVG}-\sigma=148$ nm $<0.2 \times \lambda max=156$ nm is satisfied. Thus, statistically, 50% or more and 84% or less of all protrusions satisfy the condition (no less than 178 nm) associated with the protrusion height. From the observation results of AFM and SEM and the analysis results of the fine protrusion height distribution, it is found that multi-peak fine protrusions are more likely to appear in tall fine protrusions than short fine protrusions.

FIG. 7 is a diagram illustrating the steps of producing the antireflective article 1. This production step 10 includes a resin supplying step of applying a non-cured and liquid ultraviolet-curable resin that forms a fine protrusion-shaped receiving layer 4 to the band-shaped base film 2 using a die 12. A method of applying the ultraviolet-curable resin is not limited to a method which uses the die 12, and various other methods can be used. Subsequently, this production step 10 involves pressing the base 2 against a circumferential surface of a roll plate 13 which is a mold for molding the antireflective article using a pressure roller 14 so that the non-cured and liquid acrylate-based ultraviolet-curable resin adheres to the base 2 and the ultraviolet-curable resin is sufficiently filled in concave portions having a micro-relief shape created on the circumferential surface of the roll plate 13. This production step also involves curing the ultraviolet-curable resin by irradiation of ultraviolet rays in this state to create a fine protrusion group on the surface of the base 2. Subsequently, this production step involves releasing the base 2 and the cured ultraviolet-curable resin from the roll plate 13 with the aid of a release roller 15. The production step 10 involves forming an adhesion layer or the like on the base 2 as necessary, and then, cut the base 2 in a desired size to manufacture the antireflective article 1. In this way, a large number of antireflective articles 1 are produced efficiently by sequentially molding the micro-relief shape formed on the circumferential surface of the roll plate 13 to the long base roll 2.

Figure 8:
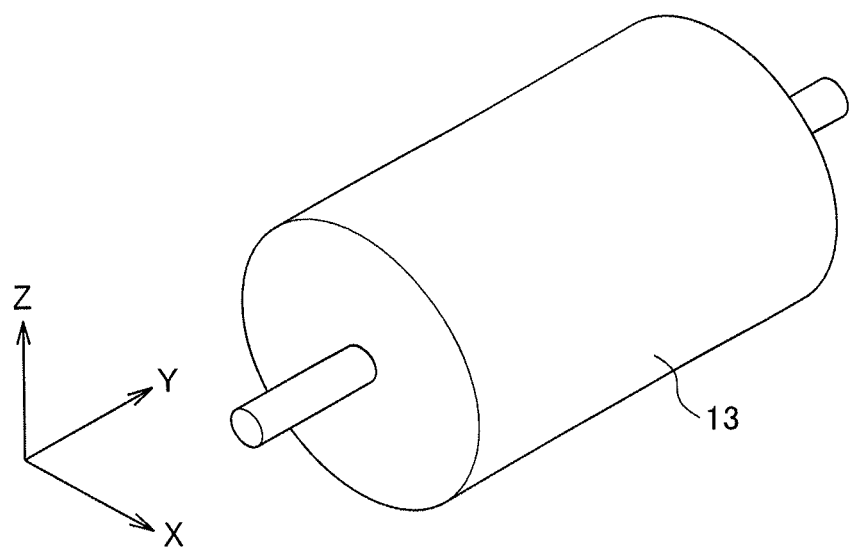
FIG. 8 is a diagram illustrating a roll plate according to the antireflective article of FIG. 1.

FIG. 8 is a perspective view illustrating a configuration of the roll plate 13. A micro-relief shape is formed on the circumferential surface of a cylindrical metallic base member of the roll plate 13 by repeating anodization and etching, and the micro-relief shape is molded to the base 2 as described above. Thus, a columnar or cylindrical member in which a high-purity aluminum layer is formed at least on the circumferential surface is used as the base member. More specifically, in the present embodiment, a hollow stainless pipe is used as the base member, and a high-purity aluminum layer is formed directly on the base member or with various intermediate layers interposed. Pipe members made from copper or aluminum may be used instead of the stainless pipe. Micro-pores are formed closely to each other on the circumferential surface of the base member of the roll plate 13 by repeating anodization and etching, the micro-pores are bored further, and the diameter of the micro-pores is gradually increased so that the diameter increases as the pore approaches the opening, whereby a relief shape is formed. As a result, a number of micro-pores of which the diameter decreases gradually in a depth direction are formed closely to each other in the roll plate 13, and a micro-relief shape is formed in the antireflective article 1 by a number of fine protrusions of which the diameter decreases gradually as the protrusion approaches the apex so as to correspond to the micro-pores. In this case, the purity (impurity amount) and the crystal grain size of the aluminum layer and the conditions for anodization and/or etching are appropriately adjusted, whereby the arrangement in a plan view of the fine protrusions is obtained as the arrangement of fine protrusions unique to the present invention.

[Anodization and Etching]

Figure 9:
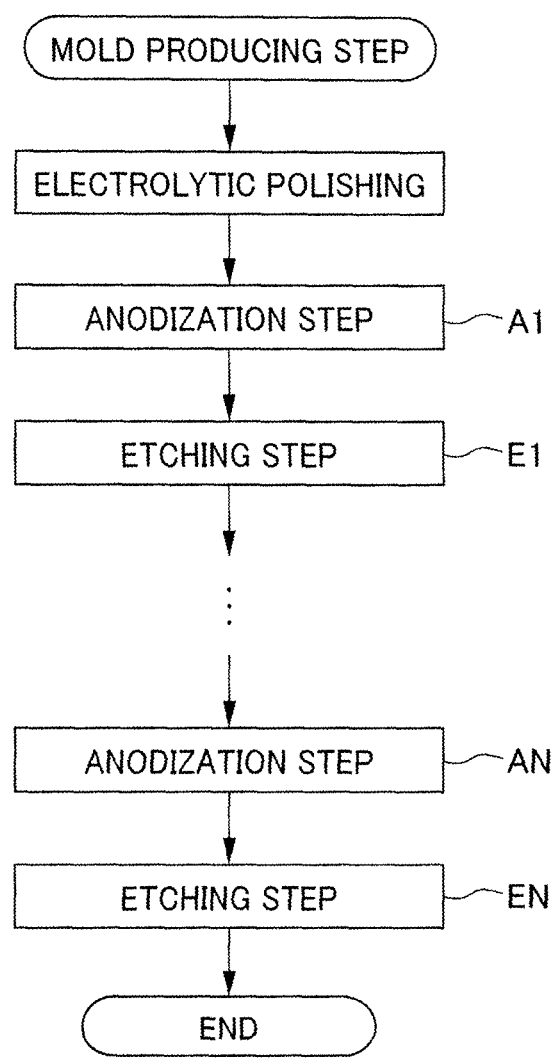
FIG. 9 is a diagram illustrating the steps of manufacturing the roll plate of FIG. 9.

FIG. 9 is a diagram illustrating the steps of producing the roll plate 13. This production step involves subjecting the circumferential surface of the base member to super-mirror finishing according to a combined electrolytic polishing method which is a combination of an electrolytic elution action and an abrasion action of abrasive grains (electrolytic polishing). Subsequently, this step involves sputtering aluminum onto the circumferential surface of the base member to form a high-purity aluminum layer. Subsequently, this step involves alternately repeating anodization steps A1, . . . , and AN and etching steps E1, . . . , and EN to process the base member to manufacture the roll plate 13.

In this production step, the anodization steps A1, and AN involve creating micro-pores in the circumferential surface of the base member according to an anodization method and further boring the created micro-pores. Here, in the anodization step, a wide range of various methods applied to anodization of aluminum can be applied as in the case where a carbon rod, a stainless plate, and the like are used for the cathode, for example. Moreover, various neutral and acid solutions can be used for a dissolving solution, and specific examples thereof include sulfuric acid solution, an oxalic acid solution, and phosphoric acid solution. In the production steps A1, . . . , and AN, a solution temperature, an application voltage, an anodization period, and the like are controlled so as to form the micro-pores in an intended depth and a shape corresponding to the fine protrusion shape.

In the subsequent etching steps E1, . . . , and EN, a mold is immersed into an etching solution to enlarge the diameter of the micro-pores created and bored in the anodization steps A1, . . . , and AN to shape the micro-pores so that the diameter decreases smoothly and gradually in the depth direction. A wide range of various etching solutions applied to this type of treatment can be applied as the etching solution, and specific examples thereof include sulfuric acid solution, an oxalic acid solution, and phosphoric acid solution. In this way, in this production steps, anodization and etching treatments are alternately executed in a plurality of numbers of time, whereby micro-pores provided for molding are created on the circumferential surface of the base member. When an anodization treatment solution itself such as the oxalic acid solution used for the anodization treatment also functions as an etching solution when the solution is brought into contact with the base member without applying a voltage. Thus, the same solution may be used for the anodization treatment solution and the etching solution, the anodization treatment may be performed by applying a predetermined voltage for a predetermined period sequentially in a state where the base member is immersed in a tank storing the solution, and the etching may be performed by immersing the base member in the tank for a predetermined period with no voltage applied.

[Improvement in Scratch Resistance]

When micro-pores were created by alternately repeating anodization and etching to create the antireflective article, a sign of room for improvement in the scratch resistance was observed. Thus, the antireflective article was observed in detail. As in the conventional antireflective articles of this type, when fine protrusions are arranged regularly at a predetermined period in a lattice form or approximately in a lattice form in a plan view, and for example, another object makes contact with the surface of the antireflective article, the fine protrusions are present at a predetermined period in the direction (that is, on the acting line) of force that the object contacting the antireflective article applies to the fine protrusion group of the antireflective article. Thus, the fine protrusions on the same acting line receive force from the object successively and sequentially. Due to this, when the external force destroys the first contacting fine protrusion, the fine protrusions on the acting line may be destroyed successively. Moreover, the broken pieces of the fine protrusion destroyed first may collide sequentially with other fine protrusions on the acting line and the number of broken pieces may increase exponentially. Due to this, in such a case, a large number of fine protrusions may be destroyed. As a result, when a portion of fine protrusions of the fine protrusion group on the surface of the antireflective article are destroyed, the shape of a wide range of fine protrusions is damaged uniformly. Due to this, the anti-reflection function deteriorated in a local region, and cloudy spots, scratches, or the like appears in the contacting region, which caused appearance defects. On the other hand, as in the present invention represented by the present embodiment, even when the arrangement in a plan view of the fine protrusion group on the surface of the antireflective article has a specific non-lattice form (a non-periodic arrangement), when the maximum value dmax of the inter-adjacent protrusion distance is no more than the shortest wavelength $\lambda$min (that is, dmax≤$\lambda$min) of the wavelength band in which anti-reflection is to be achieved, it is possible to provide an equivalent anti-reflection performance to the antireflective article in which fine protrusion groups are arranged in a lattice form (at a predetermined period).

From the above, in the production method, when the production conditions of the roll plate were changed, the scratch resistance was improved and a sufficient anti-reflection function was obtained.

When the surface shape of the antireflective article of which the scratch resistance was improved and in which a sufficient anti-reflection function was secured was observed using an atomic force microscope (AFM) and a scanning electron microscope (SEM), fine protrusions were arranged generally in a non-lattice form in a plan view, and a predetermined proportion or more of fine protrusions were arranged so as to form Voronoi tessellation lines b of which the generating points are at the maximum points p of the fine protrusions. (hereinafter, in the present specification, such an arrangement will be also referred to as a "Voronoi arrangement"). Here, although various types of microscopes may be provided for observing the microscopic shape, AFM and SEM are suitable for observing the surface shape of the antireflective article without damaging the microscopic structure.

As described above, in the antireflective article in which fine protrusions are arranged in a non-lattice form in a plan view, as compared to an antireflective article in which fine protrusions are arranged in a lattice form, since the fine protrusions are not present at a predetermined period on the acting line of force applied to the fine protrusion group, the fine protrusions on the same acting line may not receive force from the object successively and sequentially. Due to this, even when the fine protrusion that the external force makes first contact is destroyed, the fine protrusions on the acting line may not be destroyed successively. Moreover, the broken pieces of the fine protrusion destroyed first may not collide sequentially with other fine protrusions on the acting line and the number of broken pieces may not increase exponentially. As a result, in the antireflective article of the present invention, fine protrusions are rarely damaged by external force. Moreover, even when a local region of the fine protrusion group on the surface of the antireflective article is destroyed by external force, the damage remains in a local region. Due to this, in the antireflective article of the present invention in which fine protrusions are arranged in a specific non-lattice form in a plan view, as compared to an antireflective article in which fine protrusions are arranged in a lattice form, the scratch resistance is improved and deterioration of the anti-reflection performance and the occurrence of noticeable scratches may rarely occur. Moreover, even when fine protrusions are damaged by external force, it is possible to reduce the area of the damaged portion. When the fine protrusion group has a Voronoi arrangement and an average number of Voronoi tessellation lines of which the starting points are at the Voronoi branch points is 3 or more and smaller than 4, such a Voronoi diagram becomes a figure different from a square lattice (of which the average number of Voronoi tessellation lines is 4) which is a typical 2-dimensional periodic lattice. Moreover, the anti-reflection of fine protrusion groups arranged at the generating points of the Voronoi diagram is also different from the periodic arrangement of the square lattice. Due to this, it is possible to obtain the effect of suppressing and mitigating the damages to fine protrusions due to external force more efficiently.

In particular, when the average number of Voronoi tessellation lines of which the starting points are at Voronoi branch points is larger than 3 and smaller than 4, since the Voronoi diagram becomes different from an arrangement of the hexagonal lattice (tortoise lattice), which collapses the periodic arrangement of fine protrusion groups further, it is further preferable in achieving the effect of improving the scratch resistance of the fine protrusion groups. Here, a trough portion means a region of ½ or smaller of the average protrusion height of fine protrusion groups about the minimum portion (valley portion) of the inter-adjacent fine protrusion height.

In an antireflective article, when fine protrusions are arranged according to the Voronoi arrangement, and at least a portion of net-like division lines formed on the trough portion between adjacent fine protrusions so as to surround the fine protrusions is identical to the Voronoi tessellation line, it is possible to obtain excellent scratch resistance while maintaining a sufficient anti-reflection performance. If a sufficient region having such an arrangement is not present, it is naturally not possible to obtain a sufficient scratch resistance improving effect. In this respect, in the present invention, net-like division lines are identical to Voronoi tessellation lines in a region of 20% or more and preferably 50% or more of the surface of the antireflective article.

In the roll plate provided for creating the fine protrusions described above, micro-pores are bored by repeating anodization and etching while increasing the pore diameter, whereby micro-pores provided for molding fine protrusions are created. The multi-peak fine protrusions are formed by micro-pores having concave portions having the shape corresponding to the apexes of the moth-eye structure, and the micro-pores are created by integrating micro-pores created very closely to each other by etching. Thus, in order to arrange the fine protrusions in a non-lattice form so that at least a portion thereof is arranged in the Voronoi arrangement, the arrangement of the micro-pores created by anodization may be varied appropriately.

In the present embodiment, the anodization conditions are set so as to obtain an appropriate size of variation and the arrangement of fine protrusions is controlled based on the conditions. In this way, an antireflective article in which fine protrusions are arranged in a non-lattice form and at least a portion thereof is arranged in the Voronoi arrangement is provided.

Figure 10A:
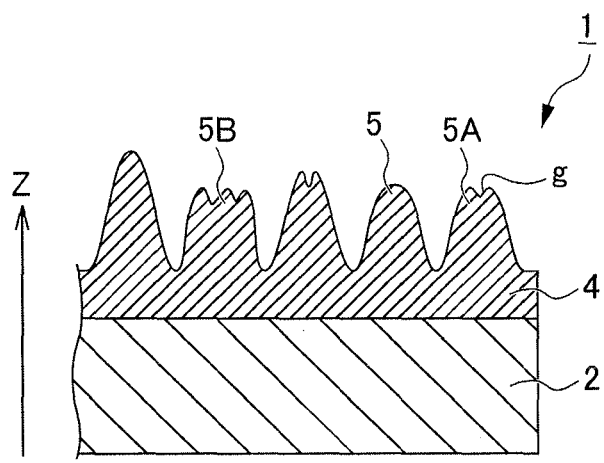
FIGS. 10A to 10C are diagrams provided for describing fine protrusions.
Figure 10B:
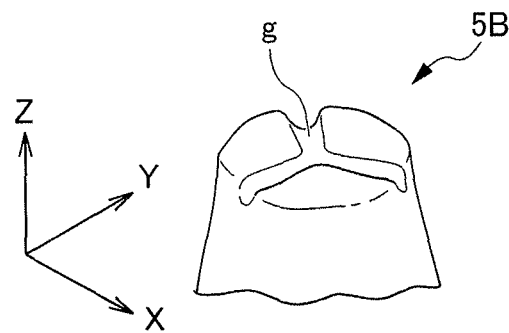
Figure 10C:
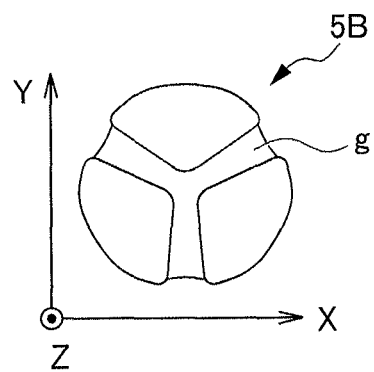
Figure 11:
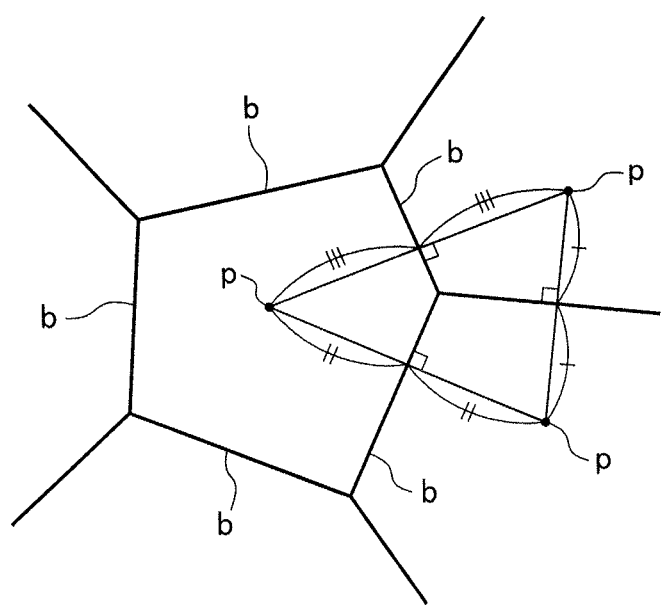
FIG. 11 is a diagram provided for describing Voronoi tessellation lines.

FIGS. 10A to 10C are a cross-sectional view, a perspective view, and a plan view provided for describing a multi-peak fine protrusion having a plurality of peaks. FIGS. 10A to 10C are diagrams illustrated schematically for better understanding of the present invention, and FIG. 10A illustrates a cross-section by lines connecting the peaks of successive fine protrusions. In FIGS. 10B and 10C, the xy direction is an in-plane direction of the base 2 and the z direction is a height direction of the fine protrusion. In the antireflective article 1, most fine protrusions 5 are formed so as to have one peak such that the cross-sectional area thereof (the cross-sectional area of a surface (the surface parallel to the XY plane in FIGS. 10A to 10C) orthogonal to the height direction) decreases gradually as the protrusion extends from the base 2 toward the peak. However, among the fine protrusions, grooves g were formed in the distal end portion as if a plurality of fine protrusions was connected, and fine protrusions having two peaks (5A) divided by a groove g, three peaks (5B) divided by a groove g, and four or more peaks (not illustrated) divided by a groove g were present. The shape of the mono-peak fine protrusion 5 can be approximated to a round shape of an apex like a paraboloidal shape or a sharp shape of a peak like a cone. On the other hand, the shape of the multi-peak fine protrusions 5A and 5B is approximated to such a shape that groove-shaped concave portions are formed near the apex of the mono-peak fine protrusion 5 to divide the apex into a plurality of crests. As described above, the multi-peak fine protrusions are created by micro-pores which are integrated and arranged very closely to each other, and the integrated micro-pores are created by chemical processing an aluminum material according to anodization. Thus, the multi-peak fine protrusions are created such that the apex is split into crests associated with peaks by a radial groove formed in the apex. The multi-peak fine protrusions 5A and 5B have such a shape that has a plurality of crest and the shape of a vertical cross-section when cut by an imaginary cutting plane including the height direction (the Z-axis direction in FIGS. 10A to 10C) is approximated to an algebraic curve $Z = a_2 X^2 + a_4 X^4 + \ldots + a_{2n} X^{2n} + \ldots$ which has a plurality of maximum points and which is convex near the maximum points. Here, n is a natural number and a1, a2, . . . are appropriate coefficients.

Even when the fine protrusion group including such multi-peak fine protrusions are formed in the antireflective article of the present invention, it is possible to provide satisfactory scratch resistance. In such a multi-peak fine protrusion having a plurality of peaks, the size of a skirt portion in relation to the size near the peak is larger than that of the mono-peak fine protrusion (that is, the circumferential length is larger). Due to this, the multi-peak fine protrusion is said to have superior mechanical strength as compared to the mono-peak fine protrusion. Thus, it is thought that the antireflective article which includes multi-peak fine protrusions having a plurality of peaks provides improved scratch resistance as compared to an antireflective article having mono-peak fine protrusions only. Further, specifically, when external force is applied to the antireflective article, since the external force is distributed to a larger number of peaks than that of the antireflective article having mono-peak fine protrusions only, it is possible to reduce the external force applied to the respective peaks to make the fine protrusions rarely damaged. Therefore, it is possible to suppress local deterioration of the anti-reflection function and to suppress the occurrence of appearance defects. Moreover, even when fine protrusions are damaged, it is possible to reduce the area of the damaged region. Further, since a large number of the multi-peak fine protrusions appear in fine protrusions of which the highest peak height (the height of a highest peak among the peaks of which the feet belong to the same fine protrusion) is equal to or larger than the average $H_{AVG}$ of the protrusion heights, the crest portions of the multi-peak fine protrusions receive the external force earlier than other portions as a sacrificial portion, damages of a body portion lower than the crests of the multi-peak fine protrusions and fine protrusions lower in height than the multi-peak fine protrusions. In this way, it is possible to suppress local deterioration of the anti-reflection function and to suppress the occurrence of appearance defects.

The measurement results illustrated in FIGS. 2 to 6 are measurement results of the antireflective article according to the present embodiment. In the frequency distribution illustrated in FIG. 5, two types of maximum values are present, including short-range maximum values of which the inter-adjacent protrusion distance d (the value on the horizontal axis) is 20 nm and 40 nm and long-range maximum values of which the inter-adjacent protrusion distance d is 120 nm and 164 nm. The long-range maximum value among these maximum values corresponds to an arrangement of fine protrusion bodies (portions ranging from the hillside to the foot under the apex), and the short-range maximum value corresponds to a plurality of peaks (crests) present near the apex. In this way, it is possible to understand the presence of multi-peak fine protrusions from a frequency distribution of inter-maximum point distances.

Although the multi-peak fine protrusions can improve scratch resistance by their presence, when a sufficient number of multi-peak fine protrusions are not present, it may be not possible to obtain a sufficient effect of improving the scratch resistance. In this respect, in the present invention, the proportion of the multi-peak fine protrusions in all fine protrusions present on the surface is set to 10% or more. In particular, in order to achieve a sufficient effect of the multi-peak fine protrusions improving the scratch resistance, the proportion of the multi-peak fine protrusions is 30% or more, and preferably, 50% or more.

Further, when the antireflective article having the fine protrusion group (5, 5A, 5B, . . . ) including such multi-peak fine protrusions 5A and 5B was examined in detail, the respective fine protrusions had different heights (see FIG. 6 and FIG. 10A). Here, the height of the fine protrusions means the height of a crest (highest crest) having the largest height present in an apex of a specific fine protrusion that shares the foot (root) portion with other fine protrusions. In the case of a mono-peak fine protrusion like the fine protrusion 5 of FIG. 10A, the height of the single crest (maximum point) of the apex is a protrusion height of the fine protrusion. Moreover, in the case of a multi-peak fine protrusion like the fine protrusions 5A and 5B of FIG. 10A, the height of the highest crest among a plurality of crests that shares the foot present in the apex is the height of the fine protrusion. When the fine protrusions have different heights in this manner, and the shape of tall fine protrusions is damaged by a contacting object, for example, the shape of short fine protrusions is maintained. Due to this, it is possible to suppress local deterioration of the anti-reflection function of the antireflective article and to suppress the occurrence of appearance defects. As a result, it is possible to improve the scratch resistance.

Moreover, when dust adheres between an object and the fine protrusion group on the surface of the antireflective article, and the object slides in relation to the antireflective article, the dust may function as an abrasive, and abrasion and damage of the fine protrusion (group) is accelerated. In this case, when the fine protrusions that forms the fine protrusion group have different heights, the dust may contact strongly with tall fine protrusions and may damage the fine protrusions. On the other hand, the contacting force with short fine protrusions is weak and the damage to the short fine protrusions is reduced, and the anti-reflection performance is maintained by short fine protrusions which are not damaged or slightly damaged.

In addition to this, a fine protrusion group having different heights exhibits an anti-reflection performance in a wide range of wavelengths and is advantageous in realizing low reflectance in all spectrum bands of light having multiple wavelengths like white light or light having a wide range of spectra. This is because a wavelength band in which the fine protrusion group exhibits an excellent anti-reflection performance depends on the protrusion height as well as the inter-adjacent protrusion distance d.

Moreover, in this case, only tall fine protrusions among a number of fine protrusions make contact with the surface of various members disposed so as to face the antireflective article 1, for example. Due to this, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Moreover, when multi-peak fine protrusions are present, it is possible to improve the anti-reflection performance as compared to when the antireflective article has mono-peak fine protrusion only. That is, the multi-peak fine protrusions 5A, 5B, and the like illustrated in FIG. 2, FIG. 10A to 10C, and FIGS. 24A to 24C can decrease light reflectance as compared to mono-peak fine protrusions even when the multi-peak fine protrusions have the same inter-adjacent protrusion distance and the same protrusion height. This is because the multi-peak fine protrusions 5A, 5B, and the like exhibit a smaller change in height direction in effective refractive index near the apex than mono-peak fine protrusions having the same shape of the portion (the hillside and the foot) below the apex as the multi-peak fine protrusions.

That is, in FIGS. 10A to 10C, when z=0 is set to H=0 and the fine protrusions 5, 5A, and the like are cut along an imaginary cutting plane Z=z orthogonal to the height direction (Z-axis direction), an effective refractive index $n_{ef}$ obtained as an average of the refractive indexes between a fine protrusion on the plane Z=z and a surrounding medium (normally air) is expressed as follows. That is, when the refractive index of a surrounding medium (in this example, air) on the cutting plane Z=z is $n_A$=1, the refractive index of the constituent material of the fine protrusions 5, 5A, and the like is $n_M$>1, the sum of cross-sectional areas of the surrounding medium (air) is $S_A(z)$, and the sum of the cross-sectional areas of the fine protrusions 5, 5A, and the like is $S_M(z)$, the effective refractive index $n_{ef}$ is expressed by Expression 1 below.

$$n_{ef}(z)=1\times S_A(z)/(S_A(z)+S_M(z))+ n_M\times S_M(z)/(S_A(z)+S_M(z))$$ (Expression 1)

Here, $0\le z\le H^{PEAK}_{MAX}$ and $H^{PEAK}_{MAX}$ is the height of a highest crest of the fine protrusion. This effective refractive index has a value obtained by proportionally distributing the refractive index $n_A$ of the surrounding medium and the refractive index $n_M$ of the constituent material of the fine protrusion by the sum of the total cross-sectional area $S_A(z)$ of the surrounding medium and the total cross-sectional area $S_M(z)$ of the fine protrusion, respectively.

Here, when the mono-peak fine protrusion 5 is considered as a reference, the multi-peak fine protrusions 5A, 5B, and the like are split into a plurality of crests near the apex. Thus, on the imaginary cutting plane Z=z that cuts the portion near the apex, the proportion of the total cross-sectional area $S_A(z)$ of the surrounding medium having a relatively low refractive index in the multi-peak fine protrusions 5A, 5B, and the like increases more than the proportion of the total cross-sectional area $S_M(z)$ of the fine protrusion having a relatively high refractive index as compared to the mono-peak fine protrusions 5 and the like.

As a result, the effective refractive index $n_{ef}(z)$ on the imaginary cutting plane Z=z of the multi-peak fine protrusions 5A, 5B, and the like approaches the refractive index $n_A$ of the surrounding medium more than the mono-peak fine protrusions 5 and the like. When a difference between the effective refractive index of the multi-peak fine protrusion and the refractive index of the surrounding medium on the plane Z=z is $|n_{ef}(z)-n_A(z)|_{multi}$ and a difference between the effective refractive index of the mono-peak fine protrusion and the refractive index of the surrounding medium on the plane Z=z is $|n_{ef}(z)-n_A(z)|_{mono}$, $$|n_{ef}z-n_A(z)|_{multi} < |n_{ef}(z)-n_A(z)|_{mono} \quad \text{(Expression 2)}$$

Here, if $n_A(z)=1$, $$|n_{ef}(z)-1|_{multi} < |n_{ef}(z)-1|_{mono} \quad \text{(Expression 2A)}$$

Due to this, the fine protrusion group (including the surrounding medium between fine protrusions) including multi-peak fine protrusions can reduce a difference (more specifically, a change in the refractive index per unit distance in the height direction of the fine protrusion) between the effective refractive index and the refractive index of the surrounding medium (air) near the apex as compared to a protrusion group made up of mono-peak fine protrusions only. That is, it is possible to further improve the continuity of the change in the height direction of the refractive index.

In general, when light enters an interface between a medium having the refractive index $n_0$ and an adjacent medium having the refractive index $n_1$, the reflectance R of light on the interface is expressed as follows at the incidence angle=0°.

$$R=(n_1-n_0)^2/(n_1+n_0)^2 \quad \text{(Expression 3)}$$

From this expression, the smaller the refractive index difference $(n_1-n_0)$ between the media on both sides of the interface, the smaller the light reflectance R at the interface, and the closer the refractive index difference $(n_1-n_0)$ approaches the value 0, the closer the reflectance R approaches the value 0.

From Expressions 2, 2A, and 3, the fine protrusion group (including the surrounding medium between the fine protrusions) including the multi-peak fine protrusions 5A, 5B, and the like can reduce the light reflectance better than a protrusion group made up of mono-peak fine protrusions 5 and the like.

Even when a fine protrusion group made up of the mono-peak fine protrusions 5 only is used, it is possible to provide a sufficient anti-reflection effect by setting the maximum value dmax of the inter-adjacent protrusion distances to a sufficiently small value no more than the shortest wavelength λmin of the wavelength band of electromagnetic waves of which reflections are to be prevented. However, in this case, since the inter-adjacent crest distance is the same as an inter-fine protrusion distance, a phenomenon (so-called sticking) that the adjacent fine protrusions come into contact with each other to be integrated together may occur. When sticking occurs, a practical inter-adjacent protrusion distance d increases by the number of integrated fine protrusions.

For example, when four fine protrusions having d=200 nm are stuck together, the size of the stuck and integrated protrusion becomes d=4×200 nm=800 nm and becomes larger than the longest wavelength (780 nm) of the visible wavelength band. Thus, the anti-reflection effect deteriorates in this local region.

On the other hand, in the case of a fine protrusion group made up of the multi-peak fine protrusions 5A, 5B, and the like, an inter-adjacent protrusion distance $d^{PEAK}$ between crests near the apex is smaller than an inter-adjacent protrusion distance $d_{BASE}$ of a fine protrusion body ranging from the foot to the hillside $(d^{PEAK} < d_{BASE})$ and generally, $d^{PEAK}$ is approximately $d_{BASE}/4$ to $d_{BASE}/2$. Thus, when the inter-adjacent protrusion distance between respective crests is set such that $d^{PEAK} \ll \lambda min$, it is possible to obtain a sufficient anti-reflection performance. However, the ratio of the height of a crest portion of a multi-peak fine protrusion to the width of the crest portion is small and is approximately ½ to 1/10 of the ratio of the height of a peak of a mono-peak fine protrusion to the width of the crest portion. Thus, the crest portion of the multi-peak fine protrusion is less likely to be deformed than the mono-peak fine protrusion with respect to the same external force. On the other hand, the body portion itself of the multi-peak fine protrusion has a larger inter-adjacent protrusion distance and a larger strength than the crest portion. Thus, the fine protrusion group made up of multi-peak fine protrusions can suppress the sticking and realize a low reflectance more easily than the protrusion group made up of mono-peak fine protrusions.

Moreover, in other applications of the anti-reflection of visible light or in visible light environments, by forming a moth-eye structure corresponding to intended anti-reflection wavelengths and providing a height distribution, it is possible to manufacture an anti-reflection material having scratch resistance superior to the conventional anti-reflection material. Moreover, even when a low-rigidity material is used due to process requirements, it is possible to manufacture an anti-reflection material which prevents sticking and provides a required optical performance. For example, when it is desired to provide an anti-reflection performance in an ultraviolet wavelength region around 380 nm, the fine protrusions may have a height of approximately 50 nm. Similarly, when it is desired to provide an anti-reflection performance in an infrared wavelength region around 700 nm, the fine protrusions may have a height of approximately 150 nm to 400 nm from practical reasons. The reflectance of the antireflective article can be effectively controlled by finding a production condition in which the arrangement pitch of the fine protrusions saturates with respect to a height. Further, it is possible to obtain a satisfactory height and reflectance by adding an improvement in the apex structure of the fine protrusions from the conventional mono-peak structure. Moreover, it is possible to prevent the occurrence of the sticking physically and reduce the reflectance effectively.

Thus, in order to form both multi-peak fine protrusions and mono-peak fine protrusions, the interval of micro-pores created by anodization may be varied greatly similarly to control of the arrangement on the horizontal surface described above. Moreover, it can be said that the variation in the height of the micro-pores results from a variation in the depth of micro-pores created in the roll plate and that the variation in the depth of micro-pores also results from the variation during the anodization.

Here, an application voltage (formation voltage) in the anodization is in a proportional relation with the micro-pore interval, and the variation in the micro-pore interval increases when the application voltage deviates from a certain range. Due to this, by using an aqueous solution of sulfuric acid, oxalic acid, and phosphoric acid having a concentration of 0.01 M to 0.03 M and applying a voltage of 15 V (first step) to 35 V (second step: approximately 2.3 times the voltage in the first step), it is possible to manufacture a roll plate for producing antireflective articles in which both multi-peak fine protrusions having a plurality of peaks and mono-peak fine protrusions are present and the height of fine protrusions and the inter-adjacent protrusion distance d vary. Since the variation in the micro-pore interval increases when the application voltage varies, the application voltage may be varied intentionally by generating the application voltage using an AC voltage biased by a DC power source, for example. Moreover, the anodization may be executed using a power source having a large voltage variation.

Figure 12:
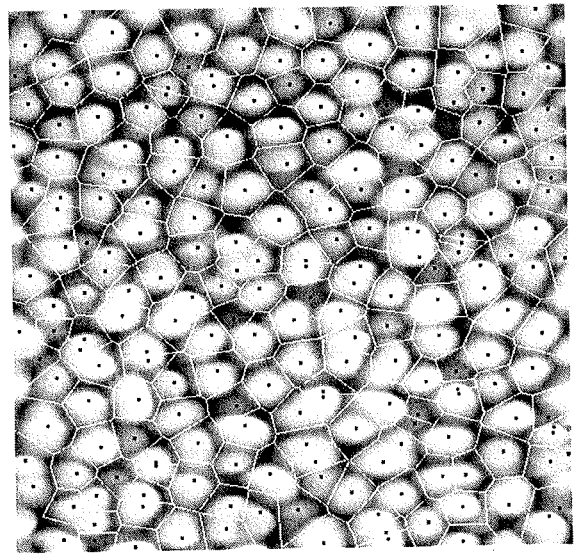
FIG. 12 is a reference diagram illustrating a Voronoi tessellation state.

FIG. 12 is a Voronoi diagram that is reciprocal with the Delaunay diagram of FIG. 4 and is a reference diagram illustrating an example by superimposing Voronoi tessellation lines (indicated by white lines) on the original image of FIG. 3. The division lines were based on 3-dimensional measurement values of the embodiment and the peaks of some of the multi-peak fine protrusions. However, this may cause slightly different divisions depending on the analysis of measurement values, and the division lines appropriately approximate the center of gravity of the plane as described above as is obvious from the drawing. At least 20% or more of the net-like division lines on all through portions in the entire region including regions other than the illustrated region were identical to the Voronoi tessellation lines. When it was determined whether the two types of lines are identical, a difference in the distance and the inclination between each line of the Voronoi tessellation lines and the corresponding net-like division line was calculated, and the determination was made based on the difference as a determination reference value. The determination reference value was 8 pixels for the distance and 0.5° for the inclination and was set by taking a detection limit in a series of processes into consideration. In the partial Voronoi diagram illustrated in FIG. 12, the average number of Voronoi tessellation lines of which the starting points are at the Voronoi branch points of 373 polygons in total included in regions other than the illustrated region was calculated as 3.05, which satisfies the conditions below.

3<Average number of Voronoi tessellation lines<4

From the analysis result of the drawing, it was found that, when the conditions for producing the roll plate were changed to a specific range of conditions, fine protrusions were arranged so that the net-like division lines between the adjacent fine protrusions described above were identical to the Voronoi tessellation lines b in a region of at least 20% of the entire surface of the antireflective article. The results of FIG. 12 were obtained when an oxalic acid solution having the temperature of 20° C. and a concentration of 0.02 M was used and anodization was executed for 120 seconds using an application voltage of 40 V. Moreover, in the etching process, the above-described anodization solution was used in the first step and a phosphoric acid solution having the temperature of 20° C. and a concentration of 1.0 M was used in the second step. The anodization and etching were executed three (to five) times each.

According to the above configuration, when fine protrusions are arranged in a non-lattice form in a plan view in the antireflective article so that at least a portion of fine protrusions is arranged in the Voronoi arrangement, it is possible to improve the scratch resistance while securing an antireflection performance as compared to the conventional antireflective article.

Second Embodiment

In the above-described embodiment, Voronoi tessellation lines were obtained using the peaks of fine protrusions as the generating point assuming that the coordinates in a plan view of the fine protrusions are approximately the same as of the peaks of the fine protrusions and the centers of gravity. Thus, in the present embodiment, Voronoi tessellation lines were obtained using the actual centers of gravity of the respective fine protrusions as the generating points, and it was checked that net-like division lines formed to surround the fine protrusions is identical to the Voronoi tessellation lines of which the generating points are at the centers of gravity in a plan view of the fine protrusions.

Figure 13:
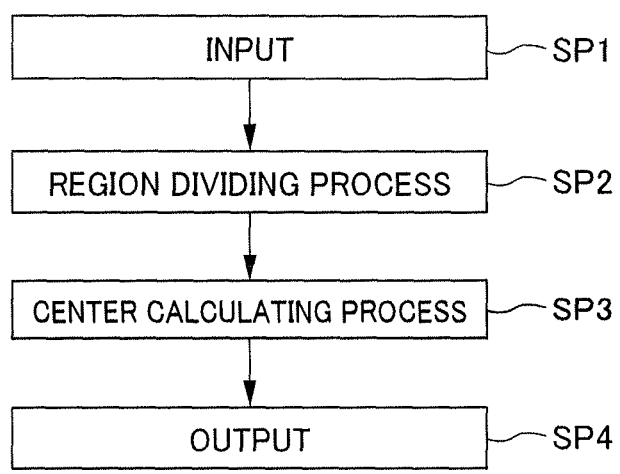
FIG. 13 is a flowchart illustrating the processes according to a second embodiment.

FIG. 13 is a flowchart illustrating the flow of processes provided for checking Voronoi tessellation lines. This process flow is executed by a computer executing a program provided for this process. In this process, first, data provided for the process is input to the computer (step SP1). Here, in the present embodiment, information on respective pixels having the xy coordinate values described in FIG. 2 and the corresponding z coordinate value is input. The z coordinate value is the coordinate value in the height direction associated with the respective pixels detected by AFM.

Subsequently, in this process, a region dividing process is executed (step SP2). Here, the region dividing process is a process of classifying the height data having the input xy coordinate values by respective fine protrusions to thereby divide a two-dimensional image having the xy coordinate values into respective fine protrusions.

Subsequently, in this process, the coordinate of the center of gravity in the plan view is detected from the coordinate values associated with the respective fine protrusions classified in this manner (step SP3).

Figure 14:
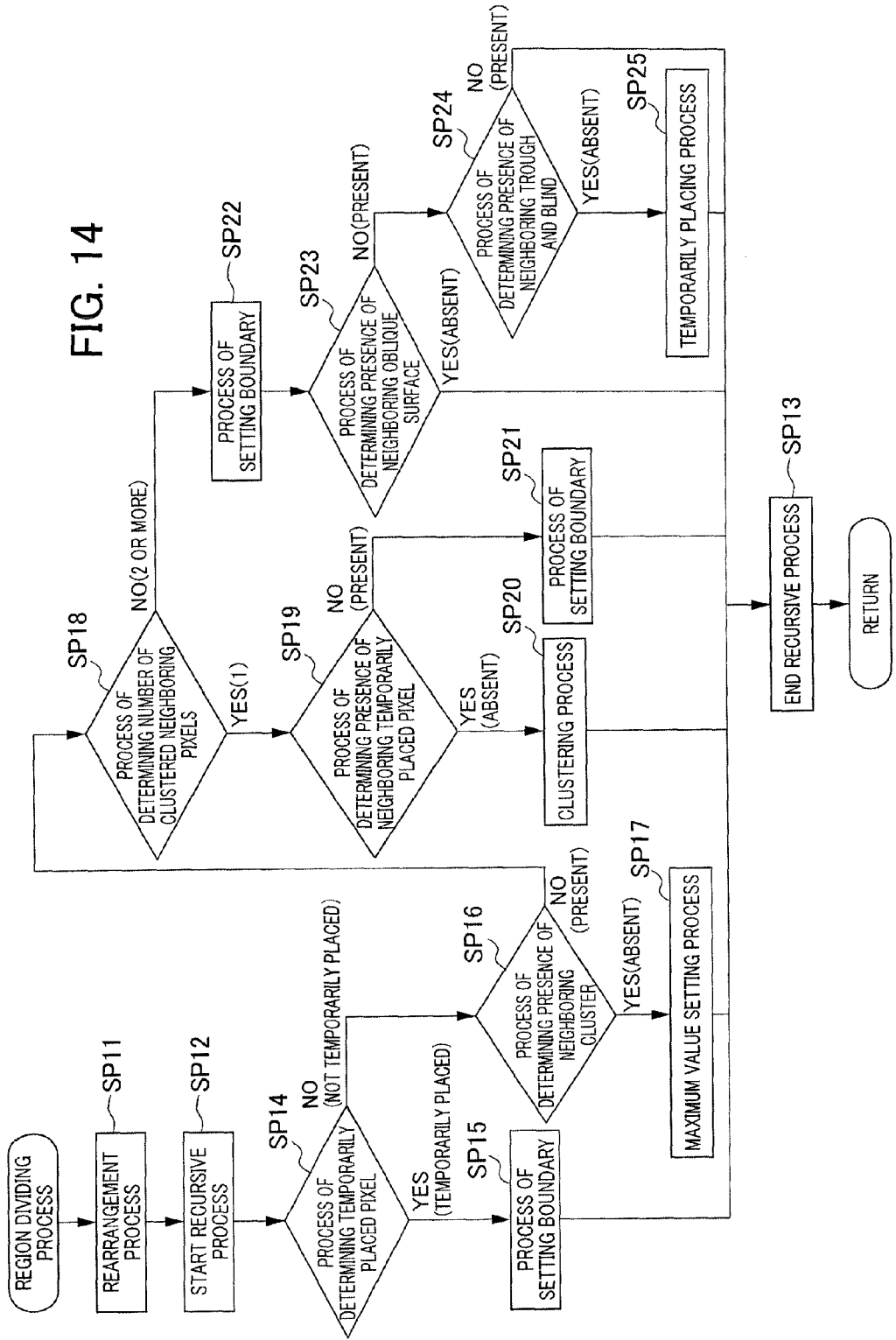
FIG. 14 is a flowchart illustrating the processes of FIG. 13 in detail.

FIG. 14 is a flowchart illustrating the region dividing process in detail. In the region dividing process, first, a rearrangement process is executed (step SP11). Here, the rearrangement process is a process of sorting the input data in descending order of heights. In the present embodiment, an attribute and a maximum value flag are set to the x, y, and z coordinate values which are the elements of a data structure representing respective pixels to obtain respective items of pixel data, and the respective items of pixel data are sorted in descending order to create a pixel list. Here, the attribute is information indicating a classification result of respective pixels and has four states of not-set, temporarily placed, a region boundary, and a class ID. Moreover, the maximum value flag is a flag provided for a peak detection process. The attribute and the maximum value flag are set to initial values.

Subsequently, in the region dividing process, a recursive process (the processes of SP12 to SP13) is executed repeatedly whereby respective items of pixel data registered in the pixel list are sequentially selected and classified in descending order of heights. Specifically, in this recursive process, processing target pixel data is selected and it is determined whether the attribute of the pixel data is "temporarily placed" (step SP14). Here, "temporarily placed" is an attribute that is set when there is a possibility that the present processing target pixel data is a pixel associated with a trough or a groove of a multi-peak protrusion in the previous processes of other items of pixel data.

Here, when the processing target pixel is "temporarily placed," the attribute of the pixel is set to boundary region to set the pixel as the boundary (trough) between fine protrusions (step SP15), and the next pixel is processed. In contrast, when the processing target pixel is not "temporarily placed," it is determined whether a pixel (a pixel which is the target of the recursive process) to which cluster ID has already been set is present in the neighboring eight pixels adjacent to the pixel (step SP16). Here, when there is no neighboring pixel to which the cluster ID has already been set, the pixel is used as a maximum value and the "maximum value flag" is set to "true," the attribute is set to a cluster ID of (1+the number of classes that have been set) (step SP17), and the next pixel is processed. Moreover, when there is a neighboring pixel to which the cluster ID has already been set, it is determined whether the number of neighboring pixels (the clustered neighboring pixels) to which the cluster ID is set is 1 (step SP18).

Here, when the number of pixels is 1, it is further determined whether a pixel of which the attribute is set to "temporarily placed" is present in the neighboring eight pixels adjacent to the pixel (step SP19). When there is no pixel which is set to "temporarily placed," the cluster ID of the pixel to which the cluster ID is set is set as the attribute of the processing target pixel (step SP20). In this way, the pixel is classified as a fine protrusion of the neighboring pixel in which the processing target pixel is detected and the next pixel is processed.

In contrast, when the number of neighboring pixels to which the cluster ID is set is 1, and a pixel of which the attribute is set to "temporarily placed" is present in the adjacent neighboring eight pixels, the attribute of the pixel is set to the boundary region (step SP21), and the next pixel is processed.

Moreover, when two or more neighboring pixels to which the cluster ID has already been set are present, the attribute of the pixels is set to the boundary region (step SP22), and it is further determined whether a pixel of which the attribute is set to "temporarily placed" is present in the neighboring eight pixels adjacent to the pixel (step SP23). When a pixel of which the attribute is set to "temporarily placed" is not present, the next pixel is processed.

In contrast, when two or more neighboring pixels to which the cluster ID is set are present, the attribute of the pixel is set to the boundary region (step SP22). Further, when a pixel of which the attribute is set to "temporarily placed" is present in the neighboring eight pixels adjacent to the pixel, it is determined whether a pixel of which the attribute is not set and which is positioned on an oblique surface is present in the neighboring eight pixels (step SP24). When such a pixel is not present, the next pixel is processed. In contrast, when such a pixel is present, a temporarily placing process is executed (step SP25).

In this temporarily placing process, a normal direction of a curved surface obtained by the XYZ coordinate values of the neighboring eight pixels is calculated from the Z coordinate values of the neighboring eight pixels, and a normal line corresponding to the normal direction is projected onto the XY plane to thereby calculate the direction of a trough from the processing target pixel. Moreover, the attribute of the pixel corresponding to the calculated trough direction among the neighboring eight pixels is set to "temporarily placed".

Figure 15:
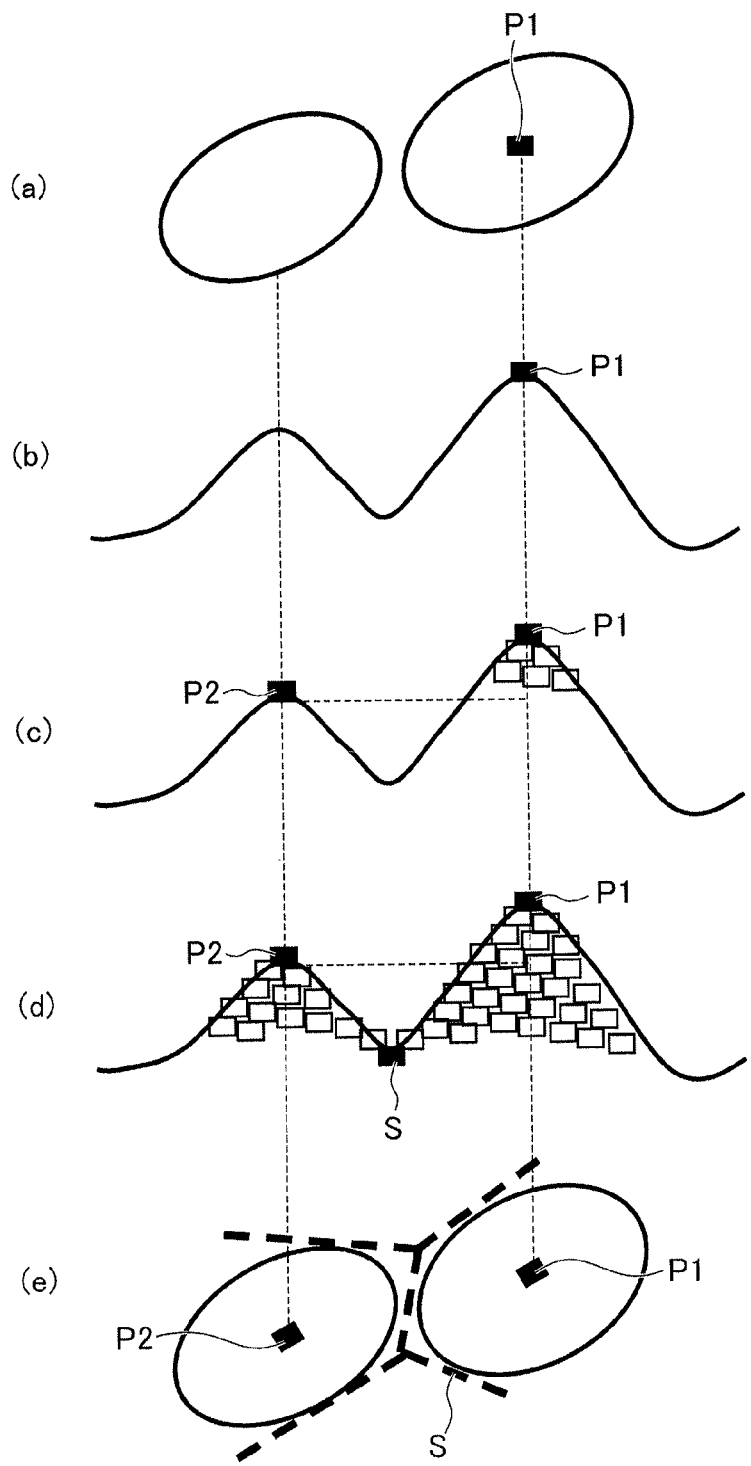
FIG. 15 is a diagram provided for describing the processes of FIG. 13.

By this series of processes, as illustrated in FIG. 15, in the present embodiment, an attribute is set to the pixels in descending order of heights by referring to the attributes of the neighboring eight pixels to detect a boundary S. FIGS. 15(a) and 15(e) are plan view of fine protrusions and FIGS. 15(b), 15(c), and 15(d) are side views. In the present embodiment, the attribute is set to the pixels in descending order of heights by referring to the attributes of the neighboring eight pixels. Thus, a pixel associated with the peak P1 is set as the processing target pixel, and the attribute is set to the class ID=1 (FIGS. 15(a) and 15(b)). Subsequently, as illustrated in FIG. 15(c), pixels near the peak P1 are sequentially set as the processing target pixels and the attributes are set to the class ID=1. After that, a pixel associated with the peak P2 is set as the processing target pixel and the attribute is set to the class ID=2 (FIG. 15(c)). Further, the pixels of protrusions associated with the peaks P1 and P2 are sequentially set as the processing target pixels and are clustered as the class ID=1 or ID=2, and the boundary S is detected (FIGS. 15(d) and 15(e)). In this way, the pixels having the z coordinate values are classified by the cluster ID of each fine protrusion.

In this series of processes, in a center-of-gravity calculating process, as indicated by the following equation, the x and y coordinate values of the respective pixels classified by the cluster ID are averaged for the respective cluster IDs to detect the coordinates (x and y coordinates) of the centers of gravity. Here n is the number of pixels of each cluster ID.

$$X_{gravity} = \frac{\sum_{i=0}^{n} x_i}{n}$$

$$X_{gravity} = \frac{\sum_{i=0}^{n} y_i}{n}$$

Figure 16:
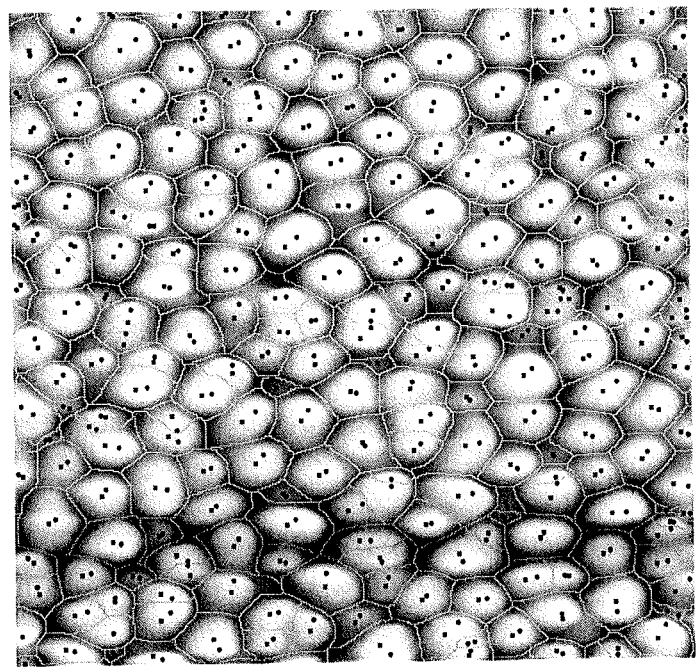
FIG. 16 is a diagram illustrating the processing results.

FIG. 16 is a diagram illustrating the boundaries and the centers of gravity detected by this series of processes together with the peaks detected in the first embodiment. According to FIG. 16, it can be understood that the peaks are approximately identical to the centers of gravity. In FIG. 16, black round dots are peaks and black rectangular dots are centers of gravity. In the present embodiment, the centers of gravity detected in this manner were set as the generating points and the Voronoi tessellation lines were created in the same manner as the first embodiment. In this case, it was confirmed that Voronoi tessellation lines were obtained approximately in the same manner as when peaks were used as generating points and that net-like division lines formed so as to surround the fine protrusions were identical to the Voronoi tessellation lines of which the generating points are at the centers of gravity in the plan view of the fine protrusions.

Figure 17:
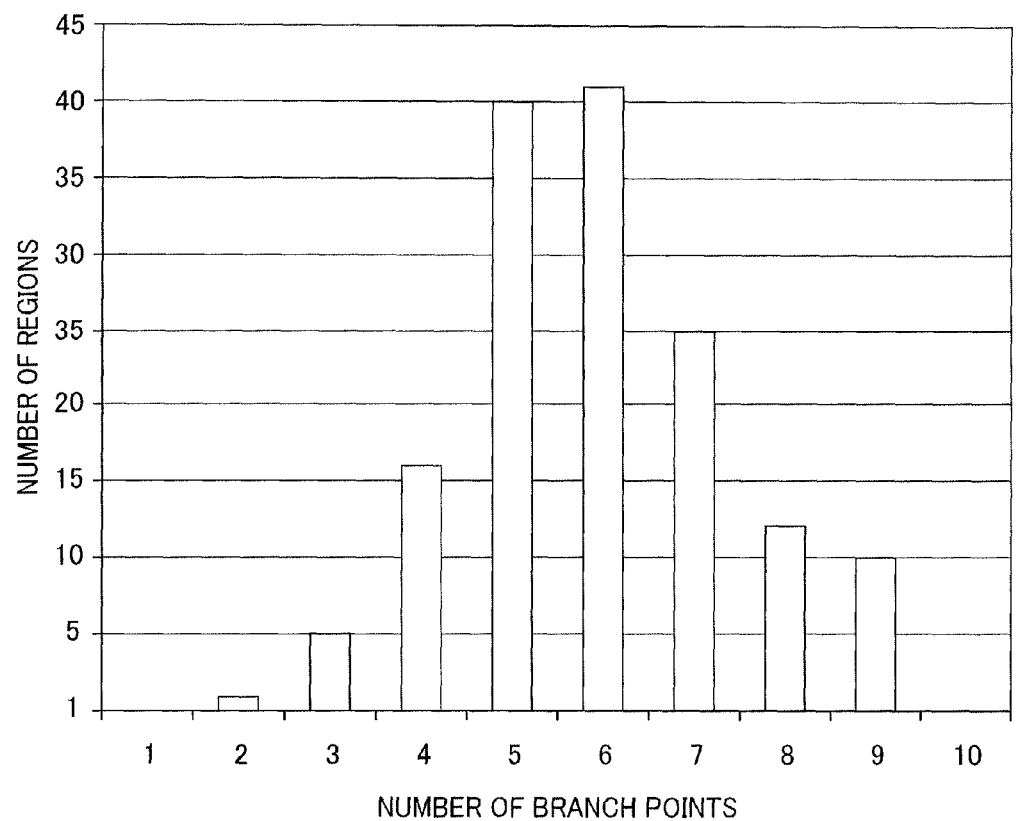
FIG. 17 is a diagram illustrating the number of branch points.

Moreover, the number of branch points were measured in the respective regions clustered in this manner. FIG. 17 is a diagram illustrating a frequency distribution of the number of branch points. According to the measurement results of the frequency distribution, although when the number of branch points is 6, the largest number of regions are clustered, the center of the frequency distribution is located on the side where the number of branch points is smaller than 6. From this, it can be understood that the fine protrusions are arranged in a non-lattice form in a plan view according to the number of branch points.

According to such a configuration, the same effects as the first embodiment can be obtained even when the Voronoi tessellation lines are obtained by using the actual centers of gravity as the generating points instead of the peaks of the fine protrusions.

[Convex Protrusion Group]

When the surface shape of the antireflective article having the improved scratch resistance described in the above embodiment was observed using AFM and SEM, it was found that a portion of a number of fine protrusions formed a generally bell-shaped convex protrusion group in which a plurality of surrounding fine protrusions having a relatively small height was formed around one apex fine protrusion having a relatively large height and the plurality of surrounding fine protrusions was arranged so that the height decreases gradually as it departs from the apex fine protrusion.

Figure 18A:
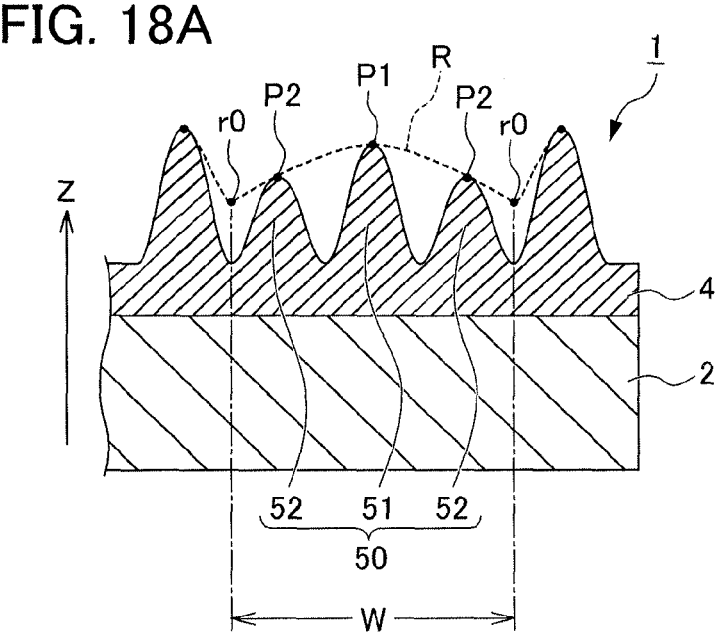
FIGS. 18A to 18C are diagrams provided for describing fine protrusions and a convex protrusion group.
Figure 18B:
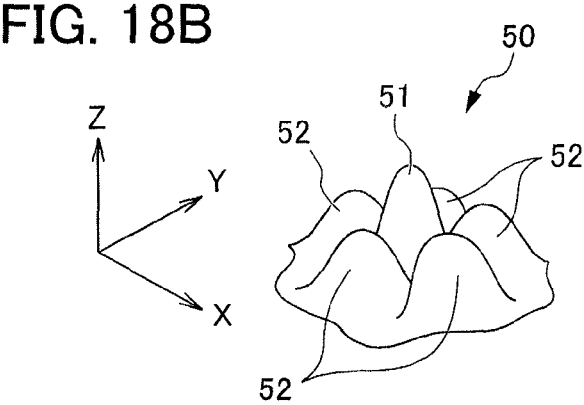
Figure 18C:
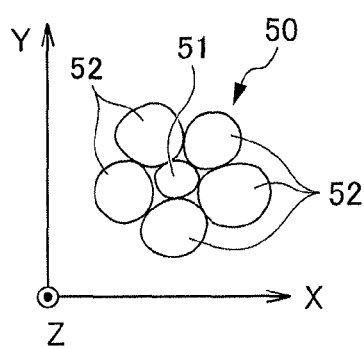

In the antireflective article 1, a portion of fine protrusions forms a group of convex protrusion groups 50, which will be described in detail later, including a plurality of fine protrusions having different heights (see FIGS. 18A, 18B, and 18C). FIGS. 18A to 18C are a cross-sectional view, a perspective view, and a plan view provided for describing a convex protrusion group including a plurality of fine protrusions. FIGS. 18A to 18C are diagrams illustrated schematically for better understanding of the present invention, and FIG. 18A illustrates a cross-section by lines connecting the peaks of successive fine protrusions of which a portion forms the convex protrusion group 50.

The convex protrusion group 50 means a group of fine protrusions in which a plurality of surrounding fine protrusions 52 having a relatively small height is arranged around one apex fine protrusion 51 having a relatively large height. (Hereinafter, the apex fine protrusion 51 and the surrounding fine protrusion 52 will be sometimes collectively referred to simply as "fine protrusions"). Preferably, the convex protrusion group 50 has a plurality of surrounding fine protrusions which is arranged so that the height decreases gradually as it departs from the apex fine protrusion.

In the convex protrusion group 50 made up of a plurality of fine protrusions having different heights, even when the shape of the tall apex fine protrusion 51 is damaged by a contacting object, for example, the shape of short surrounding fine protrusions 52 is maintained. When such a convex protrusion group 50 is formed in the antireflective article, it is possible to suppress deterioration of the anti-reflection function in a local region and to suppress the occurrence of appearance defects. As a result, it is possible to improve the scratch resistance.

Moreover, when dust adheres between an object and the fine protrusion on the surface of the antireflective article 1, and the object slides in relation to the antireflective article, the dust may function, as an abrasive, and abrasion and damage of the fine protrusion is accelerated. In this case, in the portion of the surface of the antireflective article 1 where the convex protrusion group 50 is formed, the dust may contact strongly with the tall apex fine protrusion 51 and may damage the apex fine protrusion. On the other hand, the contacting force with short surrounding fine protrusions 52 is weak and the damage to the short surrounding fine protrusions 52 is reduced, and the anti-reflection performance is maintained by the surrounding fine protrusions 52 which are not damaged or slightly damaged.

Moreover, in the convex protrusion group 50, only the apex fine protrusion 51 makes contact with the surface of various members disposed so as to face the antireflective article 1, for example. Due to this, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Further, in the convex protrusion group 50, when the surrounding fine protrusions 52 have a height that decreases as it departs from the apex fine protrusion 51, and more preferably, when an envelope surface of the convex protrusion group 50, which includes the peaks (P1, P2, . . . ) of the fine protrusions and of which the width increases as it approaches from the peak (P1) of the apex fine protrusion 51 toward the lower end (r0) has a bell-shaped curved surface, as illustrated in FIGS. 18A to 18C, the convex protrusion group 50 can exhibit the same effect as the effect provided by single fine protrusions of the so-called moth-eye structure. Therefore, the antireflective article 1 having the convex protrusion group 50 can provide an anti-reflection effect equivalent or superior to when only single fine protrusions are present as well as providing the effect of improving the scratch resistance described above.

Here, the envelope surface of the convex protrusion group 50 is a portion of a free surface created by the Bezier curve (or the B-spline curve) that includes respective maximum points of the fine protrusions of the antireflective article 1 and means a curved surface formed in a portion that ranges from one lower end r0 of a curved line to the other lower end r0 while passing through the peak (P1) of the apex fine protrusion 51. The maximum value of the distances between a plurality of points r0 in one envelope surface is defined as the width W of the convex protrusion group 50.

When the width W of the convex protrusion group 50 is 780 nm or smaller, the convex protrusion group 50 can contribute to improving the anti-reflection effect in the largest wavelength of the visible wavelength band similarly to when the inter-adjacent protrusion distance d between single fine protrusions is $\lambda$max (780 nm) or smaller as described above. When the width W of the convex protrusion group 50 is 380 nm or smaller, the convex protrusion group 50 can contribute to improving the anti-reflection effect to light beams of all wavelengths of the visible wavelength band.

In addition to the above effect, when respective fine protrusions have a height distribution (height difference) between fine protrusions on the surface of the antireflective article 1, the antireflective article exhibits a fine protrusion group having different heights exhibits an anti-reflection performance in a wide range of wavelengths and is advantageous in realizing low reflectance in all spectrum bands of light having multiple wavelengths like white light or light having a wide range of spectra. This is because a wavelength band in which the fine protrusion group exhibits an excellent anti-reflection performance depends on the protrusion height as well as the inter-adjacent protrusion distance d.

Although the convex protrusion group 50 can improve scratch resistance by its presence, when a sufficient number of convex protrusion groups are not present, it may be not possible to obtain a sufficient effect of improving the scratch resistance. Moreover, if the presence proportion is too large, the effect of localizing the portion damaged by the contacting surface of other members may naturally decrease. In this respect, in the present invention, the proportion (hereinafter referred to as an "convex protrusion group proportion") of fine protrusions that constitute the convex protrusion group 50 among the fine protrusions present on the surface is set to 10% or more and 95% or smaller. In particular, in order to achieve a sufficient effect of the convex protrusion group 50 improving the scratch resistance, the convex protrusion group proportion is set to 30% or more and 90% or smaller, and preferably, 50% or more and 85% or smaller.

Thus, in order to form such a convex protrusion group 50, it is essential that the height of the individual fine protrusions has a predetermined range of variation. Due to this, it is possible to form the convex protrusion group 50 by increasing the variation in the anodization as described above. More specifically, when the anodization condition is limited to a predetermined range, a variation of micro-pores varies based on a certain regularity and the convex protrusion groups 50 are formed in the antireflective article 1 in a predetermined proportion.

The multi-peak fine protrusions are formed by micropores having concave portions having the shape corresponding to the apexes of the multi-peak fine protrusions, and the micro-pores are created by integrating micro-pores created very closely to each other by etching. Thus, in order to form both multi-peak fine protrusions and mono-peak fine protrusions, the variation during the anodization may be increased.

Figure 19:
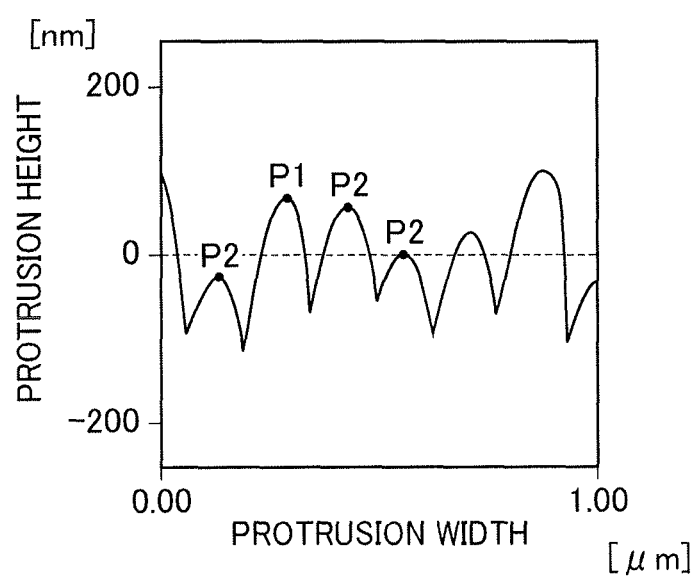
FIG. 19 is a diagram illustrating an AFM cross-sectional profile of fine protrusions and a convex fine protrusion group.

FIG. 19 is a diagram illustrating a cross-sectional profile of the convex fine protrusion group 50 measured and analyzed by AFM. In FIG. 12, it is possible to observe the convex protrusion groups 50 in which three surrounding fine protrusions 52 (P2) are formed around one apex fine protrusion (P1). FIG. 19 is a cross-sectional profile obtained when an oxalic acid solution having the temperature of 20° C. and a concentration of 0.02 M was used and anodization was executed for 120 seconds using an application voltage of 40 V. In the etching process, the above-described anodization solution was used in the first step and a phosphoric acid solution having the temperature of 20° C. and a concentration of 1.0 M was used in the second step. The anodization and etching were executed three (to five) times each.

Moreover, when the formation surface of the fine protrusion groups when anodization was executed in the same conditions as above was observed, it was confirmed that approximately 10% of fine protrusions among 219 fine protrusions which could be observed by image analysis formed the convex protrusion groups 50.

According to the above configuration, when the fine protrusions have a height distribution, it is possible to form a convex protrusion group in which a plurality of surrounding fine protrusions surrounds one apex fine protrusion and to improve the scratch resistance of the antireflective article and the sliding properties as compared to the conventional antireflective article.

[Annular Fine Protrusion Group]

Figure 20A:
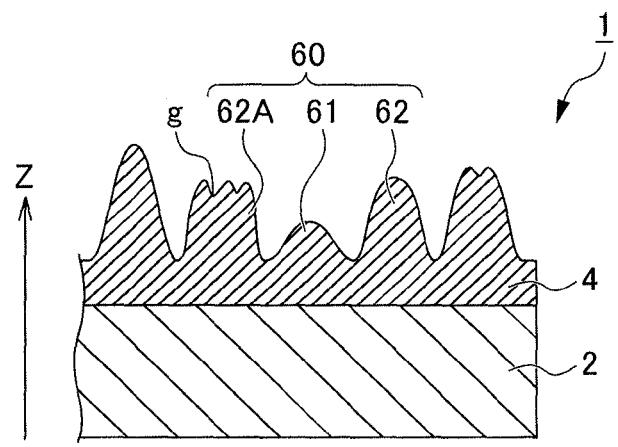
FIGS. 20A to 20C are diagrams provided for describing fine protrusions and an annular fine protrusion group.
Figure 20B:
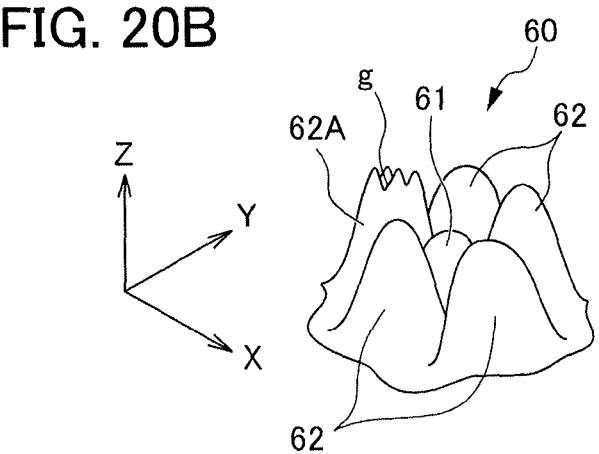
Figure 20C:
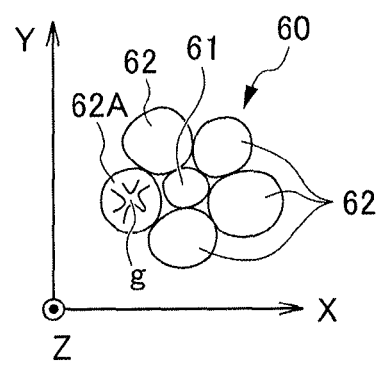

When the surface shape of the antireflective article having the improved scratch resistance was observed further using AFM and SEM, it was found that, as illustrated in FIGS. 20A to 20C, a portion of a number of fine protrusions formed an annular fine protrusion group in which a plurality of fine protrusions having a relatively large height surrounded one fine protrusion having a relatively small height. In FIGS. 20A to 20C, 61 and 62 are mono-peak fine protrusions and 62A is a multi-peak fine protrusion.

In the antireflective article 1, a portion of fine protrusions forms an annular fine protrusion group 60 including a plurality of fine protrusions having different heights (see FIGS. 20A, 20B, and 20C). The annular fine protrusion group 60 means a group of fine protrusions in which a plurality of (preferably four) outer fine protrusions 62 having a relatively large height surrounds an inner fine protrusion 61 having a relatively small height. (Hereinafter, the inner fine protrusion 61 and the outer fine protrusion 62 will be sometimes collectively referred to simply as "fine protrusions"). FIGS. 20A to 20C are a cross-sectional view, a perspective view, and a plan view provided for describing a multi-peak fine protrusion having a plurality of fine protrusions. FIGS. 20A to 20C are diagrams illustrated schematically for better understanding of the present invention, and FIG. 20A illustrates a cross-section by lines connecting the peaks of successive fine protrusions of which a portion forms the annular fine protrusion group 60. In FIGS. 20B and 20C, the xy direction is an in-plane direction of the base 2 and the z direction is a height direction of the fine protrusion.

In the annular fine protrusion group 60 made up of a plurality of fine protrusions having different heights, even when the shape of the tall outer fine protrusions 62 is damaged by a contacting object, for example, the shape of the short inner fine protrusion 61 is maintained. When such an annular fine protrusion group 60 is formed in an antireflective article, it is possible to suppress deterioration of the anti-reflection function in a local region and to suppress the occurrence of appearance defects. As a result, it is possible to improve the scratch resistance.

Moreover, when dust adheres between an object and the fine protrusion on the surface of the antireflective article 1, and the object slides in relation to the antireflective article, the dust may function as an abrasive, and abrasion and damage of the fine protrusion is accelerated. In this case, in the portion of the surface of the antireflective article 1 where the annular fine protrusion group 60 is formed, the dust may contact strongly with the tall outer fine protrusion 62 and may damage the outer fine protrusion. On the other hand, the contacting force with short inner fine protrusion 61 is weak and the damage to the short inner fine protrusion 61 is reduced, and the anti-reflection performance is maintained by the short inner fine protrusion 61 which is not damaged or slightly damaged.

Moreover, in the annular fine protrusion group 60, only the outer fine protrusions 62 among the plurality of fine protrusions make contact with the surface of various members disposed so as to face the antireflective article 1, for example. Due to this, it is possible to improve sliding properties remarkably as compared to when the antireflective article has only fine protrusions having the same height and to facilitate the handling properties of the antireflective article in production steps. From the perspective of improving the sliding properties, a height difference needs to be 10 nm or more when defined by a standard deviation, and surface roughness is sensed if the height difference is larger than 50 nm. Thus, the height difference is preferably 10 nm or more and 50 nm or smaller.

Although the convex protrusion group 60 can improve scratch resistance by its presence, when a sufficient number of convex protrusion groups are not present, it may naturally be not possible to obtain a sufficient effect of improving the scratch resistance. Moreover, if the presence proportion is too large, the effect of localizing the portion damaged by the contacting surface of other members may naturally decrease. In this respect, in the present invention, the proportion (hereinafter referred to as an "annular fine protrusion group proportion") of fine protrusions that constitute the annular fine protrusion group 60 among the fine protrusions present on the surface is set to 10% or more and 95% or smaller. In particular, in order to achieve a sufficient effect of the annular fine protrusion group 60 improving the scratch resistance, the convex protrusion group proportion is set to 30% or more and 95% or smaller, and preferably, 50% or more and 80% or smaller.

In addition to the above effect, when respective fine protrusions have a height distribution (height difference) between fine protrusions on the surface of the antireflective article 1, the antireflective article exhibits a fine protrusion group having different heights exhibits an anti-reflection performance in a wide range of wavelengths and is advantageous in realizing low reflectance in all spectrum bands of light having multiple wavelengths like white light or light having a wide range of spectra. This is because a wavelength band in which the fine protrusion group exhibits an excellent anti-reflection performance depends on the protrusion height as well as the inter-adjacent protrusion distance d.

Thus, in order to form the annular fine protrusion group 60 in the antireflective article 1, it is essential that the height of the individual fine protrusions has a predetermined range of variation. Due to this, it is possible to form the annular fine protrusion groups 60 similarly to the convex protrusion group 50 by increasing the variation in the anodization as described above.

Figure 21A:
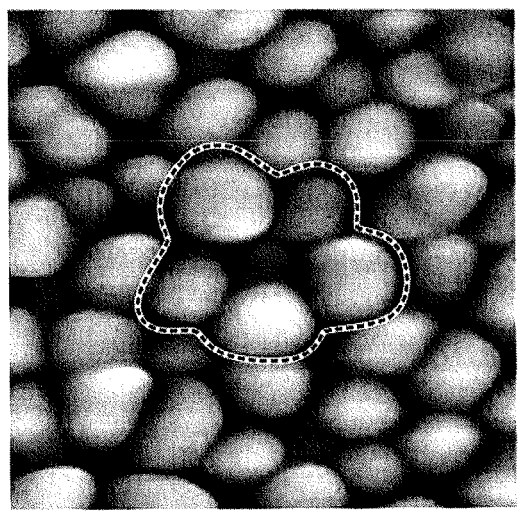
FIGS. 21A and 21B are pictures of fine protrusions and an annular fine protrusion group.
Figure 21B:
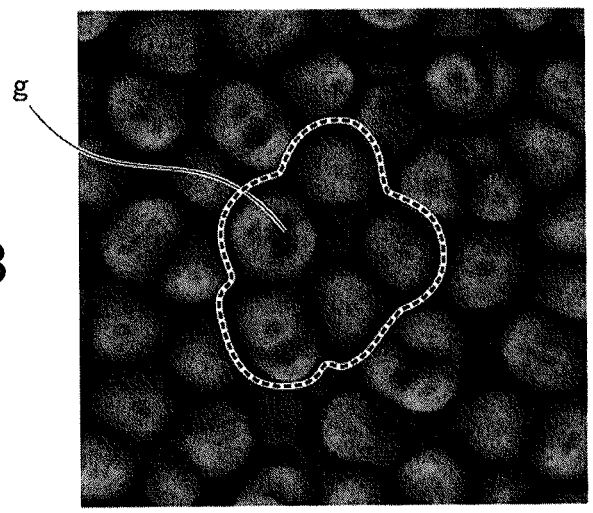

FIGS. 21A and 21B are AFM and SEM pictures illustrating the annular fine protrusion group 60, respectively. In FIGS. 21A and 21B, it is possible to observe the annular fine protrusion groups 60 in which five outer fine protrusions 62 surround one inner fine protrusion 61. FIGS. 21A and 21B are obtained when an oxalic acid solution having the temperature of 20° C. and a concentration of 0.02 M was used and anodization was executed for 120 seconds using an application voltage of 40 V. In the etching process, the above-described anodization solution was used in the first step and a phosphoric acid solution having the temperature of 20° C. and a concentration of 1.0 M was used in the second step. The anodization and etching were executed three (to five) times each.

Moreover, when the formation surface of the fine protrusion groups when anodization was executed in the same conditions as above was observed, it was confirmed that approximately 8% of fine protrusions among 219 fine protrusions which could be observed by image analysis formed the annular fine protrusion groups.

According to the above configuration, when the fine protrusions have a height distribution, it is possible to form an annular fine protrusion group in which a plurality of outer fine protrusions surrounds one inner fine protrusion and to improve the scratch resistance of the antireflective article and the sliding properties as compared to the conventional antireflective article.

Third Embodiment

FIGS. 22A to 22E are diagrams provided for describing anodization and etching according to a third embodiment. The present embodiment has the same configuration as the above-described embodiments except for the configuration associated with FIGS. 22A to 22E, with which multi-peak fine protrusions, annular fine protrusion groups, and the like are created more reliably.

Here, in the present embodiment, first to fifth steps are sequentially executed to create micro-pores provided for molding to produce a roll plate. The application voltage during anodization is proportional to the pitch of the created micro-pores. However, practically, the micro-pore pitch has variations due to the grain boundary of aluminum provided for the treatments. However, in FIGS. 22A to 22E, it is assumed that such variations are not present and the micro-pores are created in a regular arrangement. Moreover, in FIGS. 22A to 22E, the left diagrams are enlarged view of the surface of the roll plate 13 and the right diagrams are cross-sectional views along line a-a in the left diagrams. Moreover, in respective steps, the same reference numerals as those used for the corresponding steps of FIG. 9 are used.
(First Step)

As illustrated in FIG. 22A, first, a voltage V1 is applied to an aluminum layer on the surface of a molding mold to execute the anodization step A1, and then, the etching step E1 is executed to form micro-pores f1. Here, in the anodization step A1, a trigger for subsequent anodization is created on a flat aluminum surface. In this case, the etching step may be omitted as necessary.
(Second Step)

Subsequently, a voltage V2 (V2>V1) higher than the voltage V1 is applied to execute the anodization step A2, and then, the etching step E2 is executed. In this way, in the anodization step A2, as illustrated in FIG. 22B, micro-pores f1 having the interval corresponding to the anodization step A2 among the micro-pores f1 formed by the anodization step A1 are bored further. In the present embodiment, in the anodization step A2, micro-pores f1 formed in the previous anodization step A1 are bored further at intervals of two micro-pores. Thus, broad and deep micro-pores f2 are formed on the surface of the molding mold at intervals of two micro-pores, and both micro-pores f1 and micro-pores f2 are formed on the surface of the roll plate 13.
(Third Step)

Subsequently, a voltage V3 (V3>V2) higher than the voltage V2 is applied to execute the anodization step A3, and then, the etching step E3 is executed. In this step, micro-pores having different pitches are created. Specifically, when the application voltage is increased gradually from the voltage V2 to the voltage V3 in a discrete (step-wise) manner, it is possible to create a height distribution (a depth distribution of micro-pores) of fine protrusions in a discrete manner. When the application voltage is increased continuously, it is possible to set the depth distribution of fine protrusions to have a normal distribution. Thus, in the present embodiment, the application period of the application voltage in the anodization step A3 and the processing period in the etching step are set to be longer than those of the first and second steps. As a result, the micro-pores f1 created in the first anodization step A1 are bored further so as to be united into two or one pore, and the bottom surface of a united micro-pore f3 is approximately flat (flat micro-pore forming step). Here, "approximately flat" means a state where the bottom surface of a micro-pore is flat and a state where the bottom surface is curved with a large radius of curvature.
(Fourth Step)

Subsequently, a voltage V4 (V4>V3) higher than the voltage V3 is applied to execute the anodization step A4, and then, the etching step E4 is executed. In this step, micro-pores having the pitch corresponding to an intended inter-protrusion interval are created. In the anodization step A4, the application voltage is increased gradually from the voltage V3 to the voltage V4. In this way, a portion of micro-pores f3 which have been bored further in the third step, and as a result, as illustrated in FIG. 22D, a micro-pore f4 is formed, and the micro-pore f4 forms a mono-peak fine protrusion having a large height.
(Fifth Step)

Subsequently, the application voltage is changed to the voltage V1 used in the first step to execute the anodization step A5, and then, the etching step E5 is executed. In this step, as illustrated in FIG. 22E, a plurality of micro-pores is formed on the bottom surface of the micro-pore f3 which has been formed in the anodization step A3 and which has not been affected by the anodization step A4 of the fourth step to form the micro-pores f5 corresponding to multi-peak fine protrusions (multi-peak protrusion micro-pore forming step). Here, by adjusting the application voltage V1, it is possible to increase and decrease the number of micro-pores formed on the bottom surface of the micro-pore f5 and to adjust the interval of micro-pores.

In this way, the micro-pores f1, f2, and f4 that form fine protrusions having different heights and the micro-pores f5 that form multi-peak fine protrusions are formed on the surface of the molding mold. Here, in this series of steps, the micro-pores f1 and f2 having different depths created in the first and second steps are bored further in the third step to create the fine protrusions f3 having an approximately flat bottom surface, the micro-pores f3 are bored further in the fourth step to create the micro-pores f4 associated with mono-peak fine protrusions, and the bottom surface of the fine protrusions f3 is processed in the fifth step to create the micro-pores f5 associated with multi-peak fine protrusions. Thus, it is possible to control the height distribution of the fine protrusions and the height distribution of the multi-peak fine protrusions by controlling the application voltage, the processing period, and the etching period in the anodization associated with the first to fourth steps to control the depth and the like of the micro-pores created in the respective steps. The first to fifth steps may be omitted, repeated, or integrated as necessary.

According to the third embodiment, it is possible to produce the roll plate provided for creating multi-peak fine protrusions and the like with a more specific configuration.

Fourth Embodiment

Figure 23:
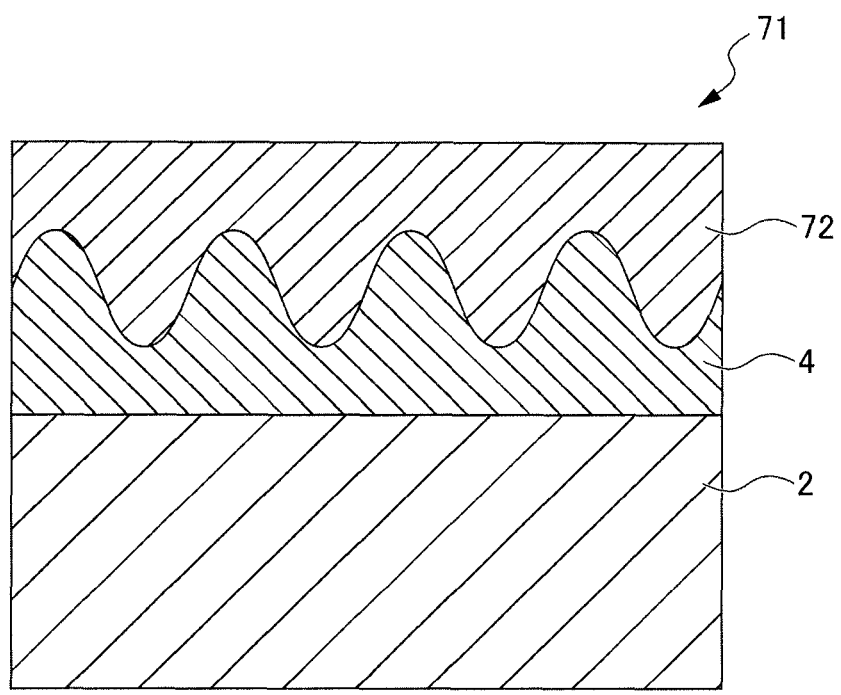
FIG. 23 is a diagram provided for describing an antireflective article according to a fourth embodiment.

FIG. 23 is a cross-sectional view illustrating an antireflective article according to a fourth embodiment of the present invention. This antireflective article 71 has a mold releasing agent 72 which is formed on a surface of the antireflective article 71 and of which the refractive index (close to the refractive index of air) is smaller than that of an ultraviolet-curable resin. The antireflective article 71 has the same configuration as that of the above-described embodiment except that the mold releasing agent 72 is formed.

In the present embodiment, the antireflective article 71 having the mold releasing agent 72 on the surface prevents scratches more effectively and prevents surface contaminations. That is, when a mold releasing agent is formed on a film material or the like, it is possible to prevent scratches and surface contaminations. However, if the mold releasing agent is removed, the film material may be damaged and the contamination preventing effect may decrease.

However, in the antireflective article according to the present embodiment, a number of fine protrusions are arranged closely to each other, and in particularly, some of these fine protrusions are multi-peak fine protrusions, and annular fine protrusion groups and convex protrusion groups having different protrusion heights are created. Thus, it is possible to suppress the possibility of the removal of the mold releasing agent remarkably and to provide the effect of preventing scratches and contaminations for a longer period than when a simple film material is used.

Here, examples of the mold releasing agent include various materials which can prevent surface scratches and contaminations such as silicon resins or fluorine resins. Moreover, the mold releasing agent can be arranged by various arrangement methods such as a method of attaching the mold releasing agent to a circumferential surface of a roll plate and transferring the mold releasing agent to an antireflective article to form the same on the antireflective article, a method of mixing the mold releasing agent into a molding resin layer to form the mold releasing agent on the antireflective article by beading-out the mold releasing agent, and a method of coating the surface of the antireflective article with the mold releasing agent.

In the present embodiment, by forming the mold releasing agent, it is possible to prevent scratches more effectively.

Other Embodiments

While the specific configuration of the embodiment of the present invention has been described in detail, the configuration of the above-described embodiment of the present invention may be modified into various forms without departing from the spirit of the present invention and can also be combined with the configuration of the related art.

That is, in the above-described embodiments, although a case where the anodization and the etching are repeatedly executed three (to five) times each has been described, the present invention is not limited to this, but the number of repetitions may be set to other numbers. Moreover, the present invention can be broadly applied to a case where, after the plurality of treatments are repeated, anodization may be performed as the final treatment.

Moreover, in the above-described embodiments, a case where the antireflective article is disposed on the front surface of various image display panels such as a liquid crystal display panel, an electroluminescent display panel, or a plasma display panel to improve the visibility has been described, the present invention is not limited to this. For example, the present invention can be broadly applied to a case where the antireflective article is disposed on the rear surface side of a liquid crystal display panel to suppress reflection loss of incident light from a backlight to the liquid crystal display panel (to increase the incident light utilization efficiency). Here, the front surface side of the image display panel is a light emission surface of the image light of the image display panel and the surface close to the image observer. Moreover, the rear surface side of the image display panel is the surface on the opposite side of the surface of the image display panel and is the light incidence surface of illumination light from the backlight when the image display device is a transmissive image display device which uses a backlight (back light source).

Moreover, in the above-described embodiments, although a case where an acrylate-based ultraviolet-curable resin is used as a molding resin has been described, the present invention is not limited to this but can be broadly applied to a case where various materials and various curable resins such as ultraviolet curable epoxy and polyester resins, electron-ray curable acrylate, epoxy, and polyester resins, or heat-thermosetting urethane, epoxy and polysiloxane resins are used. Moreover, the present invention can be broadly applied to a case where heated thermoplastic resins are pressed and molded.

Moreover, in the above-described embodiments, as illustrated in FIG. 1, the receiving layer 4 (ultraviolet-curable resin layer) is laminated on one surface of the base 2 to form a laminated structure, the fine protrusion groups are molded onto the receiving layer 4 of the laminated structure, and the receiving layer 4 is cured to form the antireflective article 1. This antireflective article 1 has a laminated structure having two layers. However, the present invention is not limited to this embodiment. Although not illustrated in the drawing, the antireflective article 1 of the present invention may have a single-layer structure in which the fine protrusion groups are molded directly on one surface of the base 2 with no layer interposed. Alternatively, the antireflective article 1 may have a laminated structure including at least three layers in which the receiving layer 4 is formed on one surface of the base 2 with at least one intermediate layer (a layer which improves surface performance such as interlayer adhesion, coating properties, or surface smoothness, and which is also referred to a primary layer or an anchor layer) interposed and the fine protrusion groups are molded on the surface of the receiving layer.

Further, in the above-described embodiment, as illustrated in FIG. 1, although the fine protrusion groups are formed on only one surface of the base 2 (directly or with another layer interposed), the present invention is not limited to this embodiment. The fine protrusion groups may be formed on both surfaces of the base 2 (directly or with another layer interposed). Moreover, although not illustrated in the drawing, the antireflective article 1 of the present invention as illustrated in FIG. 1 and other drawings may be formed as an adhesive article in which an optional adhesive layer is formed on the surface (the lower surface of the base 2 in FIG. 1) opposite to the fine protrusion group formation surface of the base 2 and a release film (release paper) is separably laminated on the surface of the adhesive layer. In such an embodiment, the antireflective article 1 of the present invention may be attached and laminated onto a desired surface of a desired article by the adhesive layer after separating the release film so as to expose the adhesive layer. In this way, the desired article can be provided with an anti-reflection performance. As the adhesive, various existing adhesives such as an adhesive (pressure-sensitive adhesive), a two-pack curable adhesive, an ultraviolet-curable adhesive, a thermosetting adhesive, a hot-melt adhesive, and the like, may be used.

Furthermore, although not illustrated in the drawing, the antireflective article 1 of the present invention as illustrated in FIG. 1 and other drawings may be stored, transported, sold, post-processed, and used in a state where a separable protection film is temporarily attached onto the formation surface of the fine protrusion groups 5, 5A, 5B, and the like, and the protection film may be removed at an appropriate time later on. In such an embodiment, it is possible to prevent deterioration in the anti-reflection performance due to the damage or contamination of the fine protrusion groups during storage and transportation.

Figure 24:
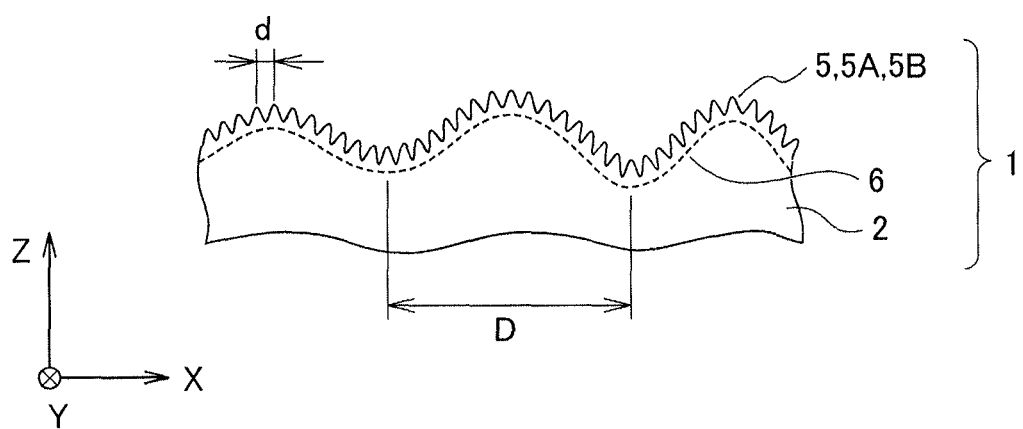
FIG. 24 is a conceptual cross-sectional view illustrating the profile indicating an uneven surface (undulation) of an envelope surface of the trough bottoms of fine protrusions.

Moreover, in the above-described embodiment, as illustrated in FIG. 1 and FIG. 10A, although the plane that connects the trough bottoms (minimum height points) between respective adjacent fine protrusions is a flat surface having a constant height, the present invention is not limited to this. As illustrated in FIG. 24, the envelope surface that connects the trough bottoms between fine protrusions may undulate with a period D (D>λmax) no less than the longest wavelength λmax of the visible wavelength band. Moreover, the periodic undulation may appear in only one direction (for example, the X-direction) of the XY plane (see FIGS. 10A to 10C and FIG. 24) parallel to the front and rear surface of the base 2 and may have a constant height in the direction (for example, the Y-direction) orthogonal to the one direction. Alternatively, the periodic undulation may appear in both two directions (the X and Y directions) of the XY plane. When the uneven surface 6 undulating with the period D satisfying the relation of D>λmax overlaps with a fine protrusion group made up of a number of fine protrusions, it is possible to scatter the remaining light of which the reflection has not been prevented by the fine protrusion group to make the remaining reflection light and in particular mirror reflection light harder to be visible. As a result, it is possible to further improve the anti-reflection effect.

When the period D of the uneven surface 6 is not constant over the entire surface but has a certain distribution, a frequency distribution of the inter-convex portion distance on the uneven surface is calculated. When an average of the inter-convex portion distance is $D_{AVG}$ and the standard deviation is $\Sigma$, a smallest inter-adjacent protrusion distance is defined as follows.

$$D_{MIN} = D_{AVG} - 2\Sigma$$

The smallest advertisement distribution apparatus is used as the period D. That is, the condition for the fine protrusion groups to provide a sufficient effect of scattering remaining reflection light is as follows.

$$D_{MIN} = \lambda max$$

In general, D or $D_{MIN}$ is set to 1 µm to 200 µm, and preferably, 10 µm to 100 µm. An example of a specific production method for forming fine protrusion groups in which an envelope surface that connects the trough bottoms of fine protrusions has the uneven surface 6 satisfying the relation of D (or $D_{MIN}$)>λmax will be described below. That is, in the step of producing the roll plate 13, a relief shape corresponding to the relief shape of the uneven surface 6 is molded to the surface of a cylindrical (or columnar) base member using sand-blasting or matte (delustering) plating. Subsequently, an aluminum layer is laminated onto the surface of the relief shape directly or after forming an appropriate intermediate layer as necessary. After that, anodization and etching are performed on the aluminum layer to which the surface shape corresponding to the relief shape is molded in the same manner as the above-described embodiments to form a fine protrusion group including the fine protrusions 5, 5A, and 5B.

Moreover, in the above-described embodiments, although a case where a film-shaped antireflective article is produced by molding using a roll plate has been described, the present invention is not limited to this. For example, an antireflective article may be created by sheet processing using a molding mold having a specific curved shape, for example, depending on the shape of a transparent base associated with the shape of the antireflective article. That is, the step and the mold for the molding treatment can be appropriately changed depending on the shape of the transparent base associated with the shape of the antireflective article.

Furthermore, in the above-described embodiments, although a case where a film-shaped antireflective article is disposed on the front surface of an image display panel or an incidence surface of illumination light has been described, the present invention is not limited to this but can be applied to various applications. Specifically, the antireflective article may be applied to an application in which the antireflective article is disposed on the rear surface (the image display panel side) of a front-surface-side member such as a touch panel provided on the screen of an image display panel with a gap therebetween, various windows, or various optical filters. In this case, it is possible to provide an effect that an interference pattern such as the Newton ring caused by the interference of light between the image display panel and the surface-side member is prevented, a ghost image caused by the multi-reflection between the emission surface of the image display panel and the light incidence surface of the surface-side member is prevented, and the reflection loss of the image light emitted from the screen and entering the surface-side member is suppressed.

Alternatively, in the antireflective article of the present invention, as a transparent electrode that constitutes the touch panel, an electrode obtained by forming the fine protrusion group unique to the present invention on a film-shaped or planar transparent base and forming a transparent conductive film such as indium tin oxides (ITO) on the fine protrusion group can be used. In this case, it is possible to provide an effect that optical reflection between the touch panel electrode and an adjacent facing electrode or various members is prevented and the occurrence of interference patterns or ghost images is suppressed.

Further, the antireflective article may be disposed on the front surface (the outer side) or both the front surface and the rear surface (the goods or exhibited object side) of a glass plate used in a show window, a goods display box of a shop, a display window, a goods display box for an exhibited object in a museum, or the like. In this case, it is possible to improve the visibility of an art collection or goods for a tourist or a customer with the help of the anti-light-reflection function of the front surface of the glass plate.

Moreover, the antireflective article may be widely used for the cases where the antireflective article is disposed on the front surface of a prism or a lens used in various optical units such as glasses, a telescope, a camera, a video camera, a gun's sight mirror (sniper's scope), binocular glasses, a periscope, and the like. In this case, it is possible to improve the visibility with the help of the anti-light-reflection function of the front surface of the lens or the prism. Furthermore, the antireflective article may be applied to the case where the antireflective article is disposed on the front surface of a printed portion (including characters, pictures, diagrams and the like) of a book so as to prevent the light reflection on the front surface of the characters and the like to improve the visibility of characters and the like. Furthermore, the antireflective article may be disposed on the front surface of a signboard, a poster, and various displays (a direction guide, a map, a no smoking sign, an entrance sign, an emergency exit sign, a restricted area sign, or the like) in various shops, streets, outer walls, and the like so as to improve the visibility thereof. Furthermore, the antireflective article may be disposed on the light incidence surface side of a window material (also serving as a diffuser plate, a light collecting lens, or an optical filter in some cases) of an illumination unit which uses a white bulb, a light emitting diode, a fluorescent lamp, a mercury lamp, EL (electroluminescence) lamp, or the like so as to prevent the light reflection of the light incidence surface of the window material to reduce the reflection loss of the light from the light source and improve the light utilization efficiency. Furthermore, the antireflective article may be disposed on the display window surface (the display observer side) of a clock or various measurement units so as to prevent the light reflection of the display window surface to improve the visibility.

Furthermore, the antireflective article may be disposed on the front surface of the indoor side, the outdoor side, or both sides of a control cabin (an operation cabin or a steering cabin) of a vehicle such as an automobile, a railroad vehicle, a ship, or an airplane so as to prevent reflection of the indoor external light from the window to improve the visibility of the controller (the operator or a steering person) to the external world. Furthermore, the antireflective article may be disposed on the front surface of a window or a lens of a night-vision device used for a security monitoring operation, the focusing operation of a gun, an astronomical observing operation, or the like so as to improve the visibility at night time or in dark places.

Furthermore, the antireflective article may be disposed on the front surface (the indoor side, the outdoor side, or both sides) of a transparent substrate (a window glass or the like) that forms a window, a door, a partition, or a wall surface of a building such as a house, a shop, an office, a school, a hospital, or the like so as to improve external world visibility or lighting efficiency. Furthermore, the antireflective article may be disposed on the front surface of a transparent sheet or a transparent plate (window material) of a greenhouse or an agricultural vinyl greenhouse so s to improve the lighting efficiency of the sunlight. Furthermore, the antireflective article may also be applied onto the front surface of a solar cell, and may improve the utilization efficiency (generation efficiency) of sunlight.

Furthermore, in the above-described embodiments, although the wavelength band of electromagnetic waves of which reflections are to be prevented is set to (the entire region or a partial region of) the visible wavelength band, the present invention is not limited to this, the wavelength band of electromagnetic waves of which reflections are to be prevented may be set to other wavelength bands such as an infrared wavelength band or an ultraviolet wavelength band other than the visible wavelength band. In this case, in the respective conditional expressions, the shortest wavelength $\Lambda min$ of the wavelength band of electromagnetic waves may be set to the shortest wavelength in which an anti-reflection effect is to be achieved, of the wavelength band such as an infrared wavelength band or an ultraviolet wavelength band. For example, when it is desired to realize anti-reflection in an infrared wavelength band of which the shortest wavelength $\Lambda min$ is 850 nm, the inter-adjacent protrusion distance d (or the maximum value dmax) may be designed to 850 nm or smaller (for example, d(dmax)=800 nm). In this case, it is possible to obtain an antireflective article which does not provide the anti-reflection effect in the visible wavelength band (380 nm to 780 nm) but provides the anti-reflection effect in infrared rays having the wavelength of 850 nm or more.

In the above-described various embodiments, when the film-shaped antireflective article of the present invention is disposed on the front surface, the rear surface, or both surfaces of the transparent substrate such as a glass plate, the antireflective article may be disposed on only a partial region instead of disposing or coating the same on the entire surface of the transparent substrate. As such an example, for example, the film-shaped antireflective article may be applied to only the indoor side surface in a square region of a center portion of one window glass and may not be applied to other regions. When the antireflective article is disposed on only a partial region of the transparent substrate, it is easy to visually recognize the presence of the transparent substrate even when a particular display or a collision prevention object is not provided. Accordingly, it is possible to provide an effect of suppressing the risk of a person being injured by colliding with the transparent substrate and an effect of preventing an indoor (interior) visible state and realizing a visible state (in the region where the antireflective article is disposed) of the transparent substrate.

The invention claimed is:

1. An antireflective article in which fine protrusions are disposed closely to each other and an interval between adjacent fine protrusions is no more than a shortest wavelength in a wavelength band of electromagnetic waves of which reflections are to be prevented, wherein
the fine protrusions are arranged in a non-lattice form in a plan view, and at least a portion of the fine protrusions forms a convex protrusion group which includes one apex fine protrusion and a plurality of surrounding fine protrusions which is formed around and adjacent to the apex fine protrusion and has a smaller height than the apex fine protrusion,
in at least a partial region of the antireflective article,
net-like division lines formed on a trough portion between adjacent fine protrusions so as to surround the fine protrusions are identical to Voronoi tessellation lines of which the generating points are at centers of gravity in the plan view of the fine protrusions.

2. The antireflective article according to claim 1, wherein in a region of 20% or more of the surface of the antireflective article, the net-like division lines are identical to the Voronoi tessellation lines.

3. The antireflective article according to claim 1, wherein in the net-like division lines identical to the Voronoi tessellation lines,
an average number of Voronoi tessellation lines of which the starting points are at Voronoi branch points is 3 or more and smaller than 4.

4. The antireflective article according to claim 1, wherein at least a portion of the fine protrusions is a multi-peak fine protrusion having a plurality of peaks.

5. The antireflective article according to claim 1, wherein the fine protrusions that form one convex protrusion group have heights which vary in a standard deviation range of 10 nm or more and 50 nm or smaller.

6. The antireflective article according to claim 1, the plurality of surrounding fine protrusions has such a height that decreases as it departs from the apex fine protrusion.

7. The antireflective article according to claim 1, wherein in an envelope surface of the convex protrusion group, which is a portion of a curved surface that includes peaks of the fine protrusions and is a bell-shaped curved surface of which the width increases as it advances toward a lower end from the peak of the apex fine protrusion,
a largest distance between the lower ends of the envelope surface is 780 nm or smaller.

8. The antireflective article according to claim 7, wherein the largest distance between the lower ends is 380 nm or smaller.

9. The antireflective article according to claim 1, wherein a proportion of fine protrusions that form the convex protrusion group among the fine protrusions is 10% or more.

10. The antireflective article according to claim 1, wherein
at least a portion of the fine protrusions forms an annular fine protrusion group which includes an inner fine protrusion and a plurality of outer fine protrusions which surround the inner fine protrusion and have a larger height than the inner fine protrusion.

11. The antireflective article according to claim 10, wherein
the fine protrusions that form one annular fine protrusion group have heights which vary in a standard deviation range of 10 nm or more and 50 nm or smaller.

12. The antireflective article according to claim 10, wherein
a proportion of fine protrusions that form the annular fine protrusion group among the fine protrusions is 7% or more.

13. An image display device in which the antireflective article according to claim 1 is disposed on a light emission surface of an image display panel.

14. An antireflective article production mold provided for producing an antireflective article in which,
fine protrusions are disposed closely to each other,
an interval between adjacent fine protrusions is no more than a shortest wavelength in a wavelength band of electromagnetic waves of which reflections are to be prevented, and
the fine protrusions are arranged in a non-lattice form in a plan view, and a portion of the fine protrusions forms a convex protrusion group which includes one apex fine protrusion and a plurality of surrounding fine protrusions which is formed around and adjacent to the apex fine protrusion and has a smaller height than the apex fine protrusion,
in at least a partial region of the antireflective article, net-like division lines formed on a trough portion between adjacent fine protrusions so as to surround the fine protrusions are identical to Voronoi tessellation lines of which the generating points are at centers of gravity in the plan view of the fine protrusions, wherein
the antireflective article production mold is produced so that micro-pores corresponding to the fine protrusions are arranged closely to each other.

15. The antireflective article production mold according to claim 14, wherein
a portion of the fine protrusions forms an annular fine protrusion group which includes an inner fine protrusion and a plurality of outer fine protrusions which surround the inner fine protrusion and have a larger height than the inner fine protrusion.

* * * * *